United States Patent
Lehtovaara

[11] Patent Number: 6,149,542
[45] Date of Patent: Nov. 21, 2000

[54] ANTI-TILT BELT TENSIONER AND METHOD FOR INSTALLING THE SAME

[75] Inventor: Jorma J Lehtovaara, Etobicoke, Canada

[73] Assignee: Litens Automotive Partnership, Ontario, Canada

[21] Appl. No.: 09/266,748

[22] Filed: Mar. 12, 1999

Related U.S. Application Data

[60] Provisional application No. 60/077,886, Mar. 13, 1998, and provisional application No. 60/105,681, Oct. 26, 1998.

[51] Int. Cl.⁷ ........................................................ F16H 7/08
[52] U.S. Cl. ......................................... 474/112; 29/888.01
[58] Field of Search ................................... 474/112, 135, 474/117, 138; 29/888.01

[56] References Cited

U.S. PATENT DOCUMENTS

| | | |
|---|---|---|
| 2,691,553 | 10/1954 | Pettigrew . |
| 2,856,785 | 10/1958 | Steele . |
| 3,422,692 | 1/1969 | Woodring . |
| 3,636,995 | 1/1972 | Newman . |
| 4,655,731 | 4/1987 | Olschewski . |
| 4,767,383 | 8/1988 | St. John . |
| 4,832,665 | 5/1989 | Kadota et al. ............................ 474/112 |
| 4,838,101 | 6/1989 | Dobberpuhl et al. . |
| 4,838,839 | 6/1989 | Watanabe et al. ........................ 474/135 |
| 5,207,620 | 5/1993 | Yamamoto et al. ...................... 474/135 |
| 5,244,438 | 9/1993 | Golovatai-Schmidt ................. 474/112 |
| 5,370,585 | 12/1994 | Thomey et al. ........................... 474/112 |
| 5,399,124 | 3/1995 | Yamamoto et al. ................. 474/112 X |
| 5,676,613 | 10/1997 | Valcourt et al. .......................... 474/102 |
| 5,676,615 | 10/1997 | McGrath et al. ......................... 474/112 |
| 5,759,125 | 6/1998 | Berg . |
| 5,820,503 | 10/1998 | Bruchner et al. . |
| 5,919,107 | 7/1999 | Stepniak .................................... 474/112 |

FOREIGN PATENT DOCUMENTS

| | | |
|---|---|---|
| 0097065A | 12/1983 | European Pat. Off. . |
| 4223323C1 | 8/1993 | Germany . |
| 4223325C1 | 10/1993 | Germany . |
| 296 02 000 U | 5/1996 | Germany ........................... F16H 7/12 |
| 681 910 A5 | 6/1993 | Switzerland ...................... F16H 7/08 |
| 491829 | 9/1938 | United Kingdom . |
| WO 93/20368 | 10/1993 | WIPO ............................... F16H 7/12 |

*Primary Examiner*—Rodney H. Bonck
*Attorney, Agent, or Firm*—Pillsbury Madison & Sutro LLP

[57] ABSTRACT

A belt tensioner for a motor vehicle engine comprises a pivot shaft and an eccentric pivoted structure mounted for pivoted movement on the pivot shaft. The belt tensioner has a rotatable pulley member mounted for rotation on the eccentric pivoted structure. A spring is constructed and arranged to bias the eccentric pivoted structure in a direction tending to force the rotatable pulley member into tensioning engagement with a belt trained about the pulley member. A mounting bolt is constructed and arranged to mount the belt tensioner on the motor vehicle engine, said pivot shaft being movable relative to said mounting bolt and towards said belt during a belt tensioner installation procedure. A linear guiding structure provides surfaces of interengagement between said belt tensioner and said motor vehicle engine to limit movement of the pivot shaft to linear movement toward the belt during the installation procedure. The present invention also relates to a method of installing a belt tensioner in which the pivot shaft moves in a substantially exactly linear fashion as the tensioner is moved into tensioning engagement with the belt. In a preferred embodiment, when the belt tensioner is moved into tensioning engagement with the belt, an external force is applied to the tensioner to balance any belt load forces tending to tilt the tensioner during installation. The present invention also discloses a tensioner that has contact portions that oppose the tilting force applied by the belt during installation, and a portion that extends beyond the contact portions to facilitate installation.

31 Claims, 14 Drawing Sheets

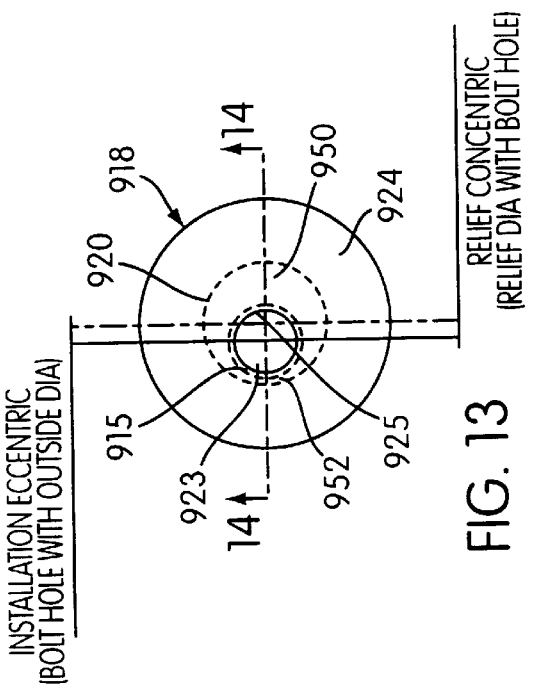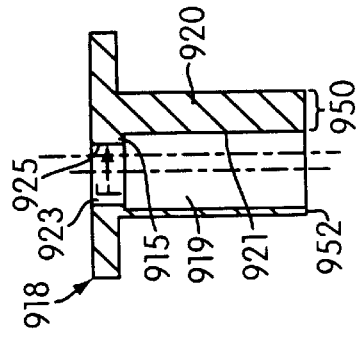
FIG. 13
FIG. 14
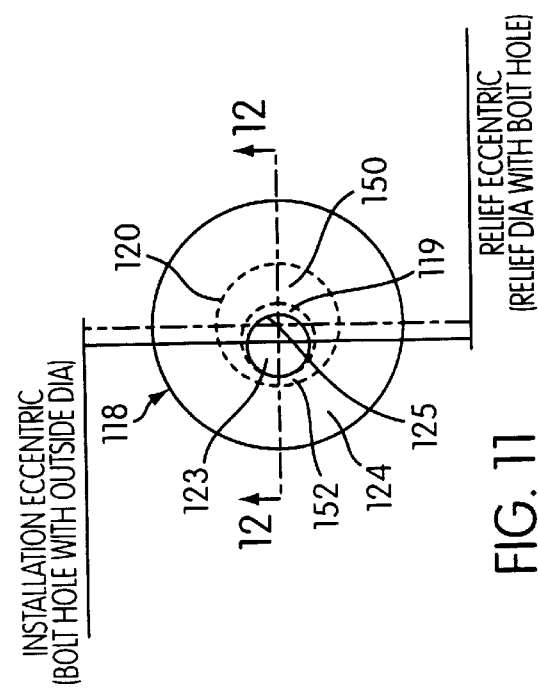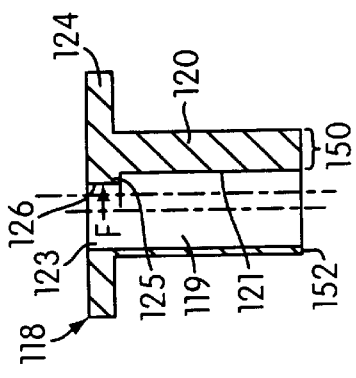
FIG. 11
FIG. 12

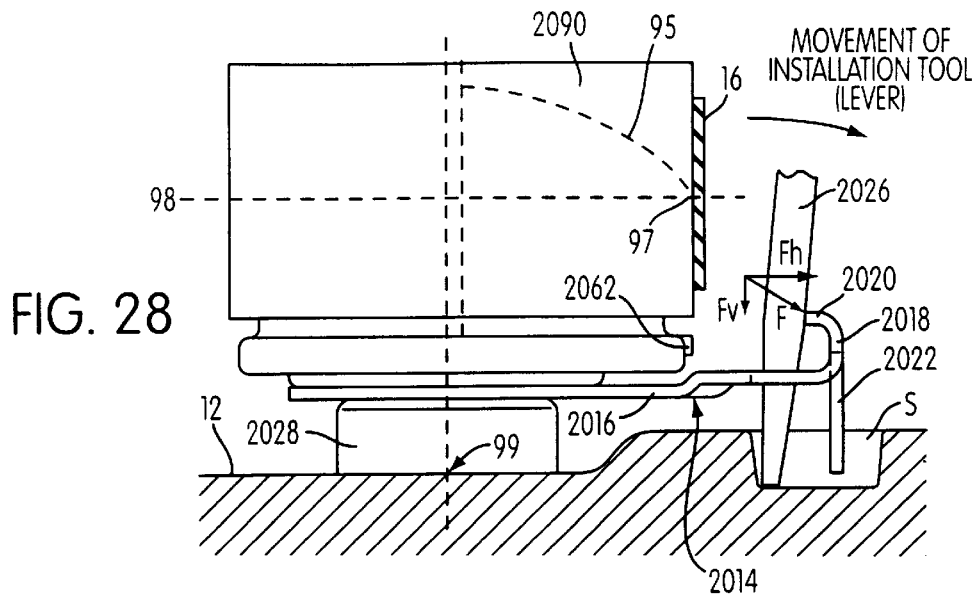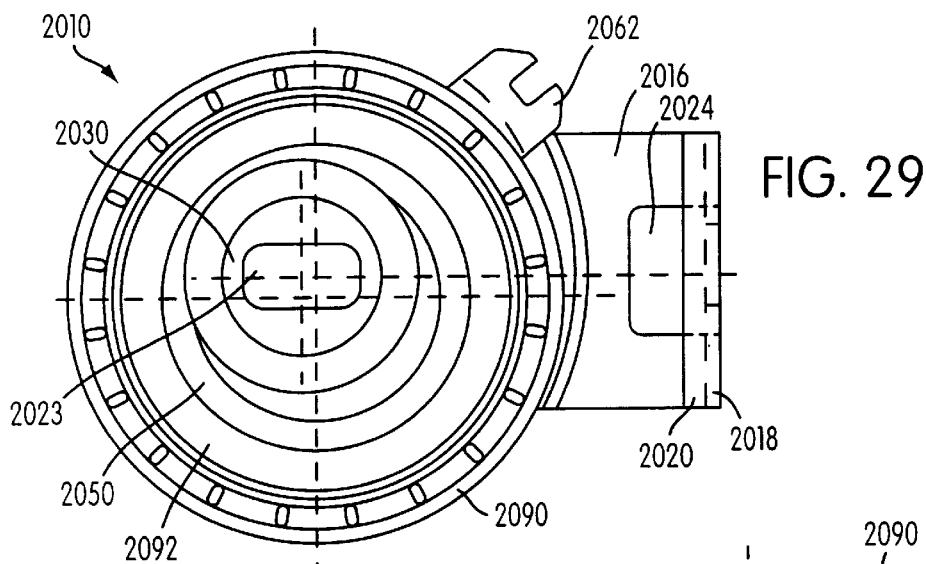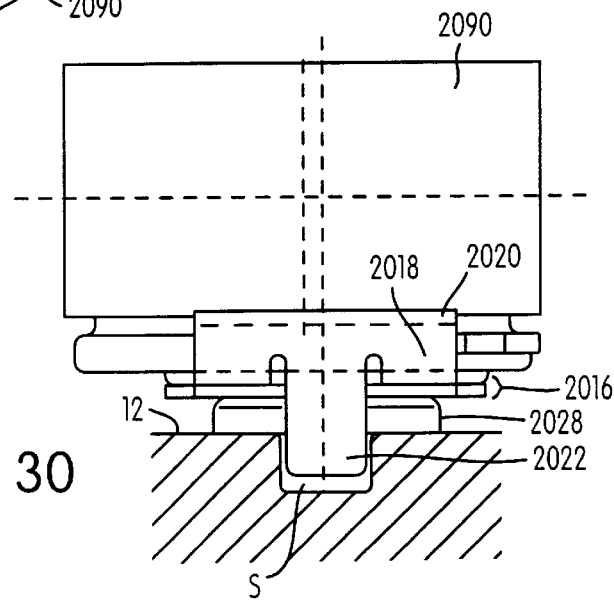

ANTI-TILT BELT TENSIONER AND METHOD FOR INSTALLING THE SAME

This application claims priority from Provisional application Ser. Nos. 60/077,886, filed Mar. 13, 1998 and 60/105, 681, filed Oct. 26, 1998, hereby incorporated by reference in full.

FIELD OF THE INVENTION

This invention relates to a belt tensioner. In particular, this invention relates to an anti-tilt belt tensioner and a method of installing such a tensioner.

BACKGROUND OF THE INVENTION

In conventional belt tensioner arrangements, the belt load force applied during installation, while the mounting bolt is still loose, has a natural tendency to apply a tilting force to the tensioner. More specifically, the loose bolt tends to pivot or tilt around the area at which the bolt enters into mounting structure. The installation shaft and pivot shaft also tend to bend or pivot about this area as a result of the belt load force and loose mounting bolt.

When the bolt is tightened after the installation shaft is rotated to move the tensioner to the nominal installation position, the bolt, installation shaft, and pivot shaft tend to straighten against the tilting action of the belt load force. It can be appreciated that this straightening action can cause the tensioner arm to rotate away from its nominal installation position. As a result, the tensioner might not be installed in its proper static position. While a position indicating pointer connected with the belt tensioner lever arm might be brought out of alignment with a position correct indicator during this tightening of the bolt to alert the operator to re-adjust the tensioner, the inaccurate positioning of the tensioner may go unnoticed due to the fact that the hysteresis forces (friction) of the tensioner may be restricting the final rotation of the belt tensioner lever arm when the tensioner and belt are static. The incorrect tensioner location may, therefore, only be detected after first running the engine (which will release the frictional "stickiness" of the tensioner).

In order to reduce the tilting of the tensioner during the installation process and the consequent unwanted movement of the lever arm caused by the final tightening of the mounting bolt, it has also become customary to specify a precise pre-tightening torque for the mounting bolt prior to the application of the installation force. The drawbacks of this practice are twofold. First, it increases the frictional forces between the tensioner and the tensioner mounting surface on the engine, requiring higher installation forces. This may also cause possible scarring of the surfaces resulting in tensioner angularity errors. Second, the practice adds extra labor and cost on the engine assembly line without satisfactorily solving the problem of erratic tensioner positioning.

U.S. Pat. No. 5,244,438 ('438 patent) discloses a belt tensioner that employs a flanged eccentric bush that extends in an axial direction essentially abutting the belt centerline plane. There are a number of shortcomings to this design. First, the flanged eccentric bush is truncated in that its axial extent terminates at the same location in which its engagement with the surrounding bearing neck terminates. This truncated configuration is impractical from a manufacturing and assembly standpoint. For example, because the eccentric bush is truncated, it may fall out from the bearing neck under the force of gravity (perpendicular to the bush axis when mounted on an engine) prior to the mounting screw being employed to mount the tensioner on the engine.

U.S. Pat. No. 5,759,125 suggests a belt tensioner arrangement comprising a rigid support base having a longitudinal slot for allowing translational displacement of the support base to adjustably secure the support base to the vehicle engine. This movement is not restricted to an arcuate, connecting-rod type movement, but is free to move in any direction as dictated by an externally applied force. This freedom of movement is no better or even worse than the connecting rod type arcuate movement with regard to proper alignment of the tensioner during installation.

SUMMARY OF THE INVENTION

To overcome the difficulties noted above, the present invention provides an arrangement in which the tensioner tilt during installation is counteracted, thereby ensuring accurate installation. This can be done manually, for example, by use of a tool or by a particular construction of the tensioner, e.g., in the way it interfaces with a mounting bolt.

In accordance with one preferred embodiment of the present invention, this is accomplished by providing a belt tensioner having integral structure that isolates the main points of installation tilting force engagement to positions remote from the engine mounting surface than the belt width centerline plane.

It is thus an object of the invention to overcome the shortcoming noted above. Accordingly, the present invention provides a belt tensioner for a motor vehicle engine, comprising a pivot shaft; an eccentric pivoted structure mounted for pivoted movement on the pivot shaft; a rotatable pulley member mounted for rotation on the eccentric pivoted structure; a spring constructed and arranged to bias the eccentric pivoted structure in a direction tending to force the pulley member into tensioning engagement with a belt trained about the pulley member when the belt tensioner has been installed on the motor vehicle engine; an eccentric installation shaft received within the pivot shaft, a mounting bolt constructed and arranged to extend through the installation shaft to secure the belt tensioner to the motor vehicle engine, the installation shaft being rotatable about the mounting bolt to move the pulley into tensioning engagement with the belt and to pre-load the spring to bias the eccentric pivoting structure; wherein a belt load force applied by the belt to the belt tensioner pulley is centered about a belt centerline plane bisecting a width of the belt; the pivot shaft contacting the installation shaft at a first contact portion opposing the belt load force, and the installation shaft contacting the mounting bolt at a second contact portion opposing the belt load force, at least one of the first and second contact portions being limited to a location on one side of the belt centerline plane remote from the motor vehicle engine, the installation shaft having a portion thereof disposed closer to the motor vehicle engine than the at least one of the first and second contact portions limited to the one side of the belt centerline plane.

A further shortcoming of the '438 patent is that it fails to provide a mechanism for adequately countering the tilting forces applied to the tensioner during installation. Accordingly, it is another object of the present invention to overcome this shortcoming as well. Thus, the present invention further provides a belt tensioner for a motor vehicle engine, and constructed and arranged to be mounted on a mounting surface of the motor vehicle engine, the belt tensioner comprising a pivot shaft, an eccentric pivoted structure mounted for pivoted movement on the pivot shaft, a rotatable pulley member mounted for rotation on the eccentric pivoted structure, a spring constructed and arranged to bias the eccentric pivoting structure in a direction tending to force the pulley member into tensioning engagement with a belt trained about the pulley member when the belt tensioner has been installed on the motor vehicle engine, an eccentric installation shaft received within the pivot shaft, a mounting bolt constructed and arranged to extend through the installation shaft to secure the belt tensioner to the motor vehicle engine, the installation shaft being rotatable about the mounting bolt to move the pulley into tensioning engagement with the belt and to pre-load the spring to bias the eccentric pivoting structure, wherein a belt load force applied by the belt to the belt tensioner pulley is centered about a belt centerline plane bisecting a width of the belt, the pivot shaft contacting the installation shaft at a first contact portion opposing the belt load force, and the installation shaft contacting the mounting bolt at a second contact portion opposing the belt load force, at least one of the first and second contact portions being limited to a location on one side of the belt centerline plane remote from the motor vehicle engine, wherein the at least one of the first and second contact portions is spaced a distance from the belt centerline plane, the distance being at least 7% of a distance between the belt centerline plane and the tensioner mounting surface of the motor vehicle engine.

In accordance with another type of tensioner device disclosed herein, a further shortcoming of prior art belt tensioner arrangements is overcome. In certain prior art tensioners, such as that in the '438 patent, the belt tensioner is guided by a connecting rod type arrangement when the tensioner is moved into tensioning engagement with a belt. As a result, the tensioner moves in an arcuate path and may not be in ideal alignment for proper tensioning of the belt when the tensioner is eventually tightened into its final installation position. It is desirable therefore to provide a belt tensioner that does not require this connecting rod controlled arcuate movement during installation.

It is an object of the present invention to provide a belt tensioner that is with guiding structure that restricts movement of the tensioner during installation to linear movement for improved alignment during installation. In accordance with this object, the present invention provides a belt tensioner for a motor vehicle engine, comprising a pivot shaft; an eccentric pivoted structure mounted for pivoted movement on the pivot shaft; a rotatable pulley member mounted for rotation on the eccentric pivoted structure; a spring constructed and arranged to bias the eccentric pivoted structure in a direction tending to force the rotatable pulley member into tensioning engagement with a belt trained about the pulley member; a mounting bolt constructed and arranged to mount the belt tensioner on the motor vehicle engine, the pivot shaft being movable relative to the mounting bolt and towards the belt during a belt tensioner installation procedure; linear guiding structure providing surfaces of interengagement between the belt tensioner and the motor vehicle engine to limit movement of the pivot shaft to linear movement toward the belt during the installation procedure.

It is a further object of the invention to provide a method for installing a belt tensioner which counteracts the normal tilting forces during installation. In accordance with this object, the present invention provides a method of installing a belt tensioner comprising a pivot shaft, a pivoted structure mounted on the pivot shaft, a rotatable pulley member mounted for rotation on the pivoted structure, a spring that biases the pivoted structure in a direction tending to force the pulley member into tensioning engagement with a belt when the belt tensioner is installed on a motor vehicle engine, the method comprising mounting the belt tensioner on the motor vehicle engine with a mounting bolt moving the pulley into forcible engagement with the belt so as to cause pivoting movement of the pivoted structure against the bias of the spring, the belt applying a counteracting belt load force to the pulley, the belt load force tending to tilt the tensioner and applying an external force to the belt tensioner in a direction which tends to balance the belt load force so as to reduce or eliminate tilting of the tensioner during installation.

In accordance with another aspect of the present invention, an integrated eccentric installation pivot shaft is provided, as opposed to a pivot shaft and separate eccentric installation shaft. In accordance with this aspect, there is provided a belt tensioner for a motor vehicle engine which comprises an eccentric installation pivot shaft. An eccentric pivoted structure is mounted for pivoted movement on the eccentric pivot shaft. A rotatable pulley member is mounted for rotation on the eccentric pivoted structure. A spring is constructed and arranged to bias the eccentric pivoted structure in a direction tending to force the pulley member into tensioning engagement with a belt trained about the pulley member when the belt tensioner has been installed on the motor vehicle engine. A mounting bolt is constructed and arranged to extend through the eccentric pivot shaft to secure the belt tensioner to the motor vehicle engine. The eccentric pivot shaft is rotatable about the mounting bolt to move the pulley into tensioning engagement with the belt and to pre-load the spring to bias the eccentric pivoting structure, wherein a belt load force is applied by the belt to the belt tensioner pulley centered about a belt centerline plane bisecting a width of the belt. The eccentric pivot shaft contacts the mounting bolt at a contact portion which opposes the belt load force. The contact portion is limited to a location on one side of the belt centerline plane remote from the motor vehicle engine.

In accordance with another aspect of the invention, the tensioner structure tilts the tensioner beyond perpendicular relation with the engine mounting surface, to actually tilt the tensioner towards the belt to accommodate for stretched belts or hysteresis of the tensioner arm in strongly damped tensioners.

IN THE DRAWINGS

FIG. 11 is a top plan view depicting an installation shaft identical to that in the embodiment of FIG. 3.

FIG. 12 is a longitudinal sectional view taken along line 12—12 of FIG. 11.

FIG. 13 is a top plan view depicting an installation shaft of a tenth embodiment of a tensioner in accordance with the present invention.

FIG. 14 is a longitudinal sectional view taken along line 14—14 of FIG. 13.

FIG. 28 is a side plan view of the belt tensioner embodiment in FIG. 27 and depicting the disposition of an installation tool in accordance with the present invention.

FIG. 29 is a plan top view of the tensioner embodiment depicted in FIG. 28.

FIG. 30 is a side view of the tensioner embodiment depicted in FIG. 28, but the view being taken from a position displaced 90° relative to FIG. 28.

DETAILED DESCRIPTION OF THE INVENTION

Figure 1:
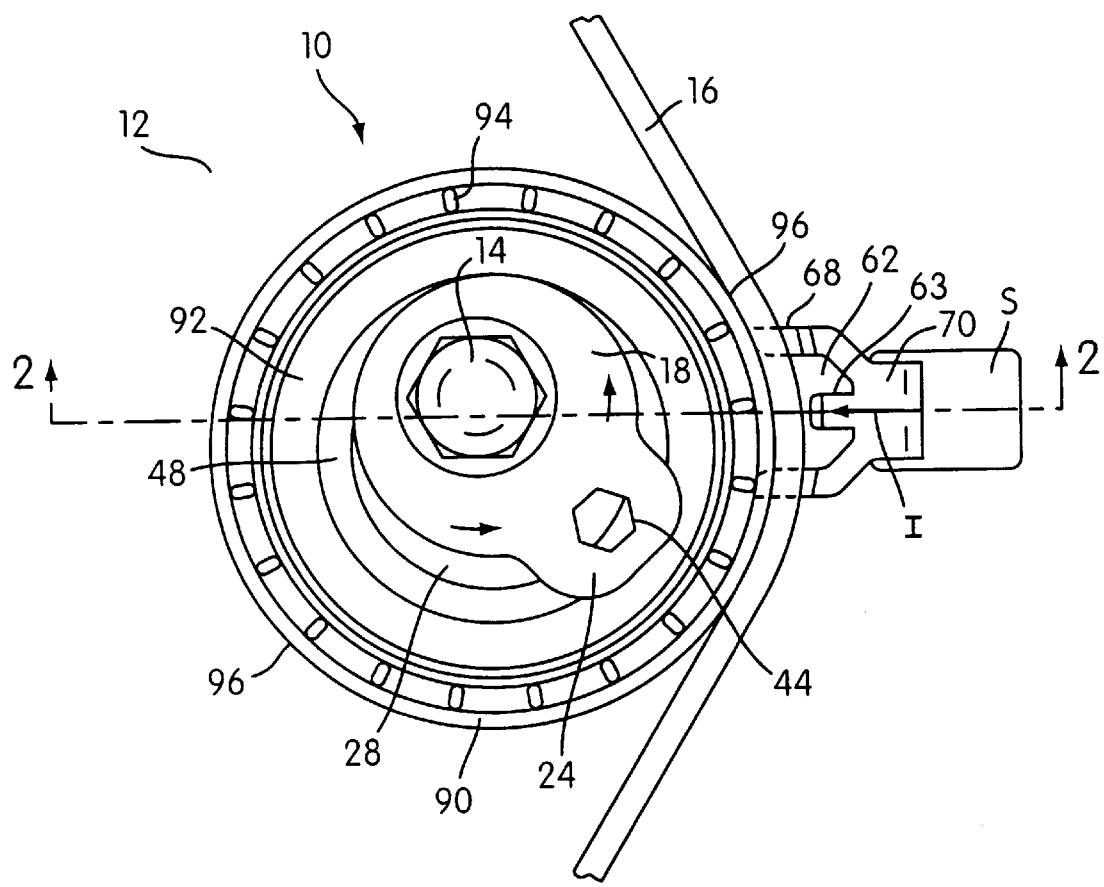
FIG. 1 is a front plan view of a belt tensioner in accordance with a first embodiment of the present invention.

Referring particularly to the drawings, FIG. 1 is a front plan view of a belt tensioner 10 in accordance with a first embodiment of the present invention. The belt tensioner 10 is shown bolted on a tensioner mounting surface, which could be an engine block or frame, generally indicated at 12. Tensioner 10 is mounted to mounting surface 12 by a threaded mounting bolt 14 and is in tensioning engagement with a drive or timing belt 16. A tubular installation shaft 18 has a main tubular portion 20 (see FIG. 2) disposed eccentrically around the mounting bolt 14 and has a radially extending flange 24 at an end of the tubular portion 20 furthest away from surface 12. A generally cylindrical pivot shaft 28 is disposed around the installation shaft 18 and is eccentric to the mounting bolt 14 by virtue of the installation shaft. An annular lever arm or pivoting eccentric 48 has a main tubular eccentric portion 50 (See FIG. 2) disposed in surrounding relation to the pivot shaft 28. A ball bearing 92 is disposed around the eccentric portion 50, and a pulley 90 is disposed around the ball bearing 92. FIG. 1 shows the belt 16 engaged with an outer surface 96 of the pulley 90. The lever arm 48 has a radially projecting pointer 62 that extends radially outwardly beyond the radial extent of pulley 90, and a notch 63 in the tip of the pointer 62 is seen in alignment with an indication mark I on an extension 70 of a base plate 68. FIG. 1 also shows that the base plate extension 70 is received within a slot S in the tensioner mounting surface 12.

Figure 2:
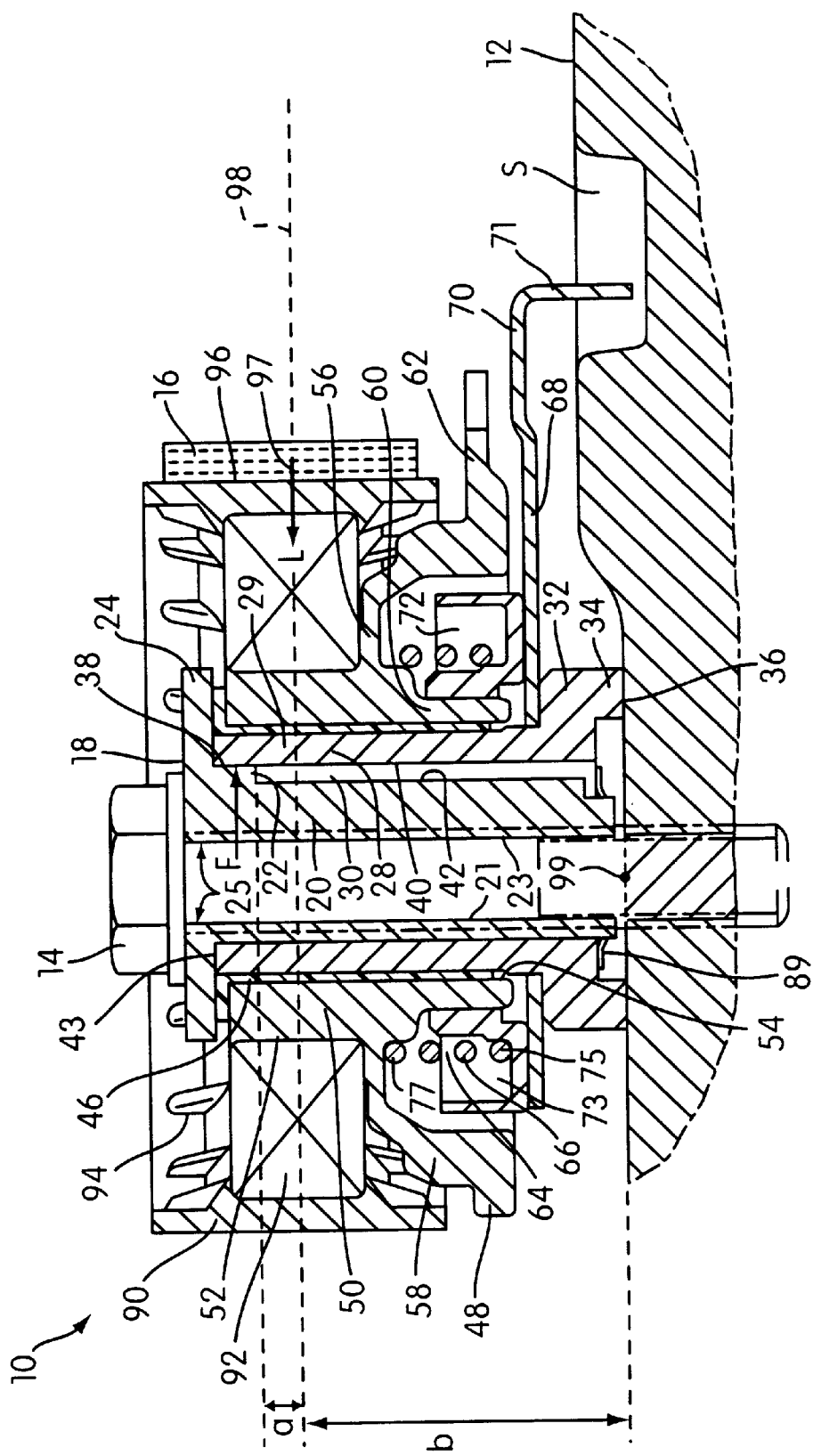
FIG. 2 is a cross-sectional view taken along the line 2—2 in FIG. 1.

FIG. 2 is a cross-sectional view taken through the line 2—2 in FIG. 1. As shown, the inner eccentric installation shaft 18 has an upper eccentric portion 22 of much less longitudinal extent but of slightly greater outer diameter than the main eccentric portion 20 so as to be of greater eccentricity than the main portion 20. The installation shaft 18 may have any construction that provides the function of maintaining the pivot or lever arm 50 in eccentric relation to the mounting bolt 14, which is disposed in a cylindrical bore 25 defined by an inner surface 21 in the installation shaft 18. The surface 21 has a portion 23 thereof that faces or opposes the belt load force applied by belt 16. The main eccentric portion 20 of the installation shaft 18 has a preferably cylindrical exterior configuration (although several other configurations are possible), and longitudinal bore 25 extends through installation shaft 18 at position axially displaced from the central longitudinal axis of the cylindrical exterior configuration. As clearly shown in FIG. 2, the main eccentric portion 20 of installation shaft 18 is disposed closer to the motor vehicle engine mounting surface 12 than the end of upper eccentric portion 22. The longer extension of the main eccentric portion 20 beyond the contacting portion provided by portion 22 facilitates assembly of the tensioner.

It can be seen in FIG. 2 that the installation shaft 18 is disposed within a longitudinal central bore 30 defined by cylindrical inner wall 40 of the tubular pivot shaft 28. The pivot shaft 28 has a main cylindrical wall portion 29 and a radially extending annular wall portion 32. Wall portion 32 is generally thicker than the main wall portion 29 of tubular shaft 28. A cylindrical lower wall portion 34 extends downwardly from the radially extending portion 32 and ends in a circular flat bottom edge 36 that is disposed in surface to surface engagement with the tensioner mounting surface 12.

The upper, eccentric portion 22 of the installation shaft 18 has a laterally or outwardly facing surface 38 which is disposed in surface-to-surface sliding engagement with the interior wall 40 of the pivot shaft 28. Outer surface 42 of the main tubular portion 20 of installation shaft 18 has a predetermined circumferential portion thereof also in contact with the inner surface 40 of the pivot shaft 28. The bottom surface of the flange 24 of the installation shaft 18 is disposed in surface to surface engagement with the flat annular top edge 43 of the pivot shaft 28. As can also be appreciated in FIG. 2, the area immediately beneath or adjacent to the upper portion 22 of installation shaft 18 in the direction towards the mounting surface 12 is devoid of any structure, thus isolating the points of contact between the surface 38 of installation shaft 18 and surface 40 of pivot shaft 28 on the side thereof towards the belt 16 to an area above the belt centerline plane indicated at 98. Otherwise stated, the belt centerline plane 98 (which bisects the width of belt 16) is closer to mounting surface 12 than the engagement between eccentric portion 22 of installation shaft 18 and inner surface 40 of pivot shaft 28. What is meant by the engagement being "above" the centerline plane is that the points of engagement are higher than the belt centerline plane as viewed in the cross-sectional views, such as that of FIG. 2. Because the mounting surface 12 in actual practice (in an engine) is normally vertical, it can also be said that the main points of tilting force transmitting engagement between the pivot shaft and installation shaft are disposed further away from the mounting surface 12 than the belt centerline plane. The configuration of the tensioner 10 embodied in FIGS. 1 and 2 causes the installation force F and belt load force L to be transferred between the pivot shaft 28 and the installation shaft 18 at the relatively limited surface area at which the lateral surface 38 of the upper eccentric portion 22 of the installation shaft 18 engages surface 40 of pivot shaft 28. The transfer of force occurs above the belt centerline plane 98 in accordance with the invention and is designed to minimize tilting of the pivot shaft 28 and entire tensioner 10 in the direction of the belt load force L about the tensioner pivot point 99.

Referring back to FIG. 1, it can be seen that flange 24 is provided with a hexagonal opening 44 therethrough adapted to cooperate with an adjusting tool (not shown) in an installation operation wherein the belt 16 is trained about the belt tensioner 10 and wherein the belt tensioner 10 is adjusted to its proper installation position.

Referring to FIG. 2, a sleeve bearing 46 is disposed in engagement with the cylindrical exterior surface of the main portion 29 of pivot shaft 28. A working lever arm 48 constitutes a pivotable structure with the main tubular eccentric portion 50 disposed in surrounding slidable engagement about the sleeve bearing 46. The lever arm eccentric portion 50 has a cylindrical exterior upper surface 52 as viewed in FIG. 2. The lever arm eccentric portion 50 also has a longitudinal bore extending therethrough defined by an interior surface 54. The interior surface 54 surroundingly engages the cylindrical outer surface of the sleeve bearing 46. The lever arm 48 is eccentrically disposed relative to the bolt 14 and to pivot shaft 28. The bolt 14, installation shaft 18, and pivot shaft 28 form a fixed structure during tensioner operation about which the pivotable lever arm 48 pivots.

Extending radially outward from the arm eccentric portion 50 is an annular wall portion 56. An outer cylindrical wall portion 58 extends from the outer periphery of the annular wall portion 56 toward the mounting surface 12 in generally concentric relation to a lower end portion 60 of the lever arm eccentric portion 50 closest to the mounting surface 12.

FIG. 2 shows the radially projecting pointer 62 extending radially outwardly from the cylindrical wall portion 58. The pointer 62 is used in installation of the belt tensioner 10 to make certain that the tensioner 10 is in its proper installation position during the initial set up, as in conventional tensioners.

The metal base plate 68 is disposed in surrounding relation to the pivot shaft 28 at the juncture between main portion 29 and the radially outwardly projecting portion 32. The base plate 68 has a projecting portion 70 that includes a bent guide portion 71 that extends into a slot S in the mounting surface 12. Engagement of the projection 71 within slot S prevents rotation of base plate 68 about pivot shaft 28 during installation or operation of the tensioner, and guides the tensioner 10 as it moves towards and away from the belt 16 during installation. An annular spring support or spring mounting structure 73 is preferably made from plastic and is prevented from rotating on the base plate 68. The mounting structure 73 has a U-shaped cross section throughout its annular extent. The U-shaped section defines an annular groove 72 facing away from the mounting surface 12 for receiving one end 75 of a coil torsion spring 64 in fixed relation. An opposite end 77 of the coil torsion spring 64 is fixed to the arm 48. The coil torsion spring 64 functions to provide a spring bias to eccentric arm 48 so as to bias the arm 48 in a pivotal direction relative to the fixed structure (which may be considered to also include mounting structure 73 and base plate 68, in addition to the previously mentioned pivot shaft 28, installation shaft 18, and bolt 14) so as to tend to tension the belt 16. The spring 64 has a main portion 66 coiled freely about the lower cylindrical portion 60 of the arm 48.

A locking ring 89 locks the installation shaft 18 to the pivot shaft 28 for shipping purposes.

The belt engaging pulley 90 is mounted on ball bearings 92 annularly disposed about the arm 48 in conventional fashion. A plurality of outer pulley support ribs 94 are evident in FIGS. 1 and 2. The pulley 90 provides a cylindrical exterior surface 96 to engage the exterior surface of the belt 16.

The intersection between the belt centerline plane 98, which is generally parallel to surface 12 and bisects the width of belt 12, and pulley outer cylindrical surface 96 along the angle of belt wrap is where the belt force, or hub load designated L, is considered to be acting. The point 97 along this intersection which bisects the angle of belt wrap around pulley 96 can be considered to be a point at which the hub load or belt load force L is applied to the tensioner. For convenience, the hub load L indicated in each of the figures herein are all acting from right to left. The installation force designated F is applied toward the right in FIG. 2, opposing the belt load force L.

After the belt 16 is trained around tensioner 10, the installation shaft 18 is rotated about the bolt 14 by use of a tool engaging opening 44. The bolt 14 is relatively loose to permit this rotation. The eccentric installation shaft 18 continues to be rotated so that the thicker upper eccentric portion 22 is moved in a direction towards the location at which the belt load force is applied. This rotation causes the rest of the tensioner to shift towards the belt. The eccentric arm and pulley will follow the base plate 68 and pivot shaft 28 during such movement until further movement of the pulley 90 is restricted by engagement with the belt 16. If the installation shaft 18 is turned further, the eccentric arm 48 begins to pivot against the bias of spring 64 so that the thicker portions of main eccentric portion 50 slowly rotate towards the belt. This causes movement of the pointer 62. The shaft 18 continues to be rotated by the operator until pointer 62 is aligned with indication I on the base plate 68. At this point, the tensioner 10 is at the correct predetermined installation position.

To install the tensioner at this proper position, the bolt 14 is tightened to lock the bolt 14, installation shaft 18, and pivot shaft 28 in place as a fixed structure. The eccentric arm 48 can now pivot with respect to the fixed pivot shaft.

Depicted in FIGS. 3 to 9 are cross sectional views of alternate embodiments of an installation shaft and pivot shaft that can be used in conjunction with the tensioner illustrated in FIGS. 1 and 2. As in the embodiment shown in FIGS. 1 and 2, the embodiments in FIGS. 3–9 are all arranged to minimize tensioner tilt during installation by isolating the main points of engagement between the pivot shaft and installation shaft to a position at or above the belt centerline plane 98.

Figure 3:
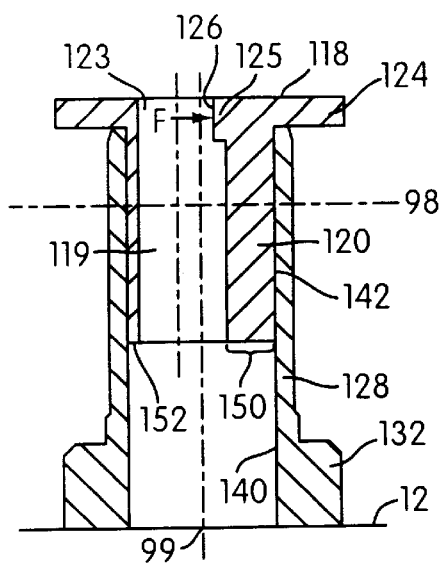
FIG. 3 is a longitudinal sectional view generally depicting an installation shaft and a pivot shaft of a second embodiment of a tensioner in accordance with the present invention.

Referring particularly to FIG. 3, a pivot shaft is indicated at 128 and an installation shaft is indicated at 118. A lower portion 132 of the wall of the pivot shaft 128 is preferably much thicker radially than the wall thickness of other portions of the pivot shaft. The main body 120 of the eccentric installation shaft 118 has an outer surface 142 which is of appropriate diameter to be disposed in engagement within the cylindrical interior surface 140 of the pivot shaft 128. The top end of the installation shaft 118 has a radially extending annular flange 124. The eccentrically disposed bore 119 of the installation shaft 118 is preferably of uniform diameter through most of its length, except for a top portion 123 of the bore that is of slightly smaller diameter as a result of a radially inwardly protruding wall portion 125. This smaller diameter portion 123 accepts a mounting bolt, such as the mounting bolt 14 depicted in FIGS. 1 and 2 for securing the tensioner to the tensioner mounting surface 12.

During installation, the installation shaft 118 is rotated around the mounting bolt. The tensioner is moved into tensioning engagement with the belt as a result of the eccentric installation shaft 118 being rotated such that the thicker wall portion 150 thereof is moved towards the belt and the thinner wall portion 152 is moved away from the belt (e.g., the belt would be disposed to the right of the pivot shaft 128 and installation shaft 118 in FIG. 3. As the belt is tensioned, it applies an increasing equal and opposite force to the tensioner. The installation force F is applied by the mounting bolt (not shown) to the surface 126 of wall portion 125, then from the outer surface 142 of the installation shaft 118 to the inner surface 140 of the pivot shaft 128. The outer surface 142 of installation shaft 118 is in surface engagement with the inside surface 140 of the pivot shaft 128. The installation force F being applied to the installation shaft 118 above the belt centerline plane 98 is effectively applied to the pivot shaft 128 above the belt centerline plane 98, thereby counteracting the tilting of the tensioner generally about the pivot point 99 at the interface of the pivot shaft 128 and mounting surface 12 during application of the installation force in accordance with the invention.

Figure 4:
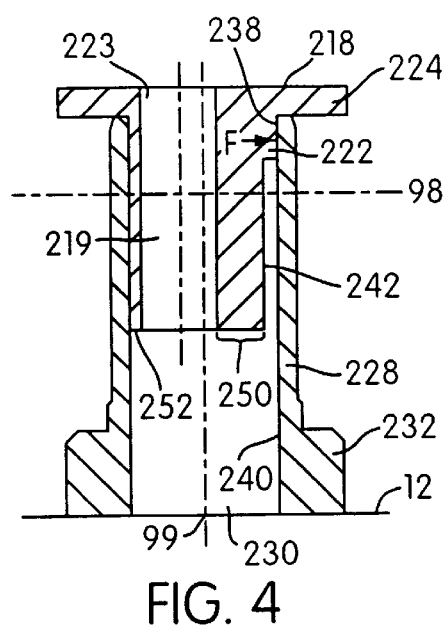
FIG. 4 is a longitudinal sectional view generally depicting an installation shaft and a pivot shaft of a third embodiment of a tensioner in accordance with the present invention.

Referring particularly to FIG. 4, an installation shaft is depicted at 218 and a pivot shaft is depicted at 228. The bore 219 of the installation shaft 218 is preferably of uniform diameter throughout its length and receives a mounting bolt (not shown). The installation shaft 218 has a radially outwardly extended upper portion 222 with an outer surface 238 disposed in surface-to-surface engagement with the interior surface 240 of the pivot shaft 228. The installation shaft 218 transmits the installation force from the bolt to the pivot shaft 228 through force F at surface 238 engagement with portion 222. During installation, the installation shaft 218 is rotated around the mounting bolt to move the outer surface 238 of the installation shaft toward the belt 16 and move the tensioner to its installation position. The relatively limited area where the outer cylindrical surface 238 of the installation shaft 218 has contact with the inner surface 240 of the pivot shaft 228 is where the installation force F is applied from the installation shaft 218 to the pivot shaft 228. This particular application of force F to oppose the hub load L occurs at or above the belt centerline plane 98 in accordance with the invention and tilting of the tensioner is counteracted during installation.

Figure 5:
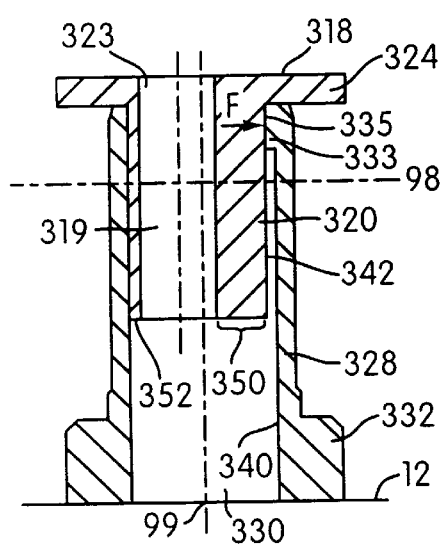
FIG. 5 is a longitudinal sectional view generally depicting an installation shaft and a pivot shaft of a fourth embodiment of a tensioner in accordance with the present invention.

Referring particularly to FIG. 5, an installation shaft is indicated at 318 and a pivot shaft is indicated at 328. A top portion 333 of the pivot shaft 328 projects radially inwardly towards the installation shaft to define a reduced diameter portion of the bore 330 of the pivot shaft 328. This top portion 333 of the pivot shaft 328 has a radially inwardly facing surface 335 that engages outer surface 342 of the installation shaft 318. The area of contact between the installation shaft 318 and pivot shaft 328 in the installation force direction F is limited to where the outer surface 342 of installation shaft 318 touches the surface 335 of the top portion 333 created by the eccentric reduced diameter portion of the pivot shaft 328. As the installation shaft 318 is rotated during installation to move the thicker wall portion 350 toward the belt 16, the installation force F is applied from the installation shaft 318 to the pivot shaft 328 to oppose the belt load force L at or above the belt centerline plane 98 in accordance with the invention.

Figure 6:
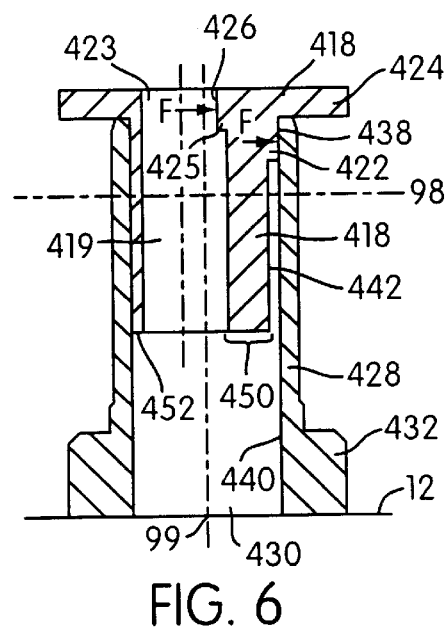
FIG. 6 is a longitudinal sectional view generally depicting an installation shaft and a pivot shaft of a fifth embodiment of a tensioner in accordance with the present invention.

Referring particularly to FIG. 6, an installation shaft 418 and a pivot shaft 428 are indicated. A bolt engagement hole 423 is disposed through the top of the installation shaft 418 and constitutes a smaller diameter eccentric upper portion of the bore 419 of the installation shaft 418, resulting in a radially inwardly extending projection 425 of the installation shaft 418. Additionally, a radially outwardly extending upper portion 422 of the installation shaft 418 below a flanged top portion 424 is of a diameter allowing this upper portion 422 to be disposed in surface-to-surface sliding relation within the pivot shaft inner surface 440. The result of this configuration is that when the installation shaft 418 is rotated during installation directing the contact surfaces 425 and 438 toward the belt, the installation force F is directed from the mounting bolt to the most radially inwardly projecting surface 426 of the projection 425 of the installation shaft 418, then from the lateral surface 438 of the larger diameter upper portion 422 of the installation shaft 418 to the inside surface 440 of the pivot shaft 428. The installation force F is thereby applied against the hub load L at or above the belt centerline plane 98 in accordance with the invention.

Figure 7:
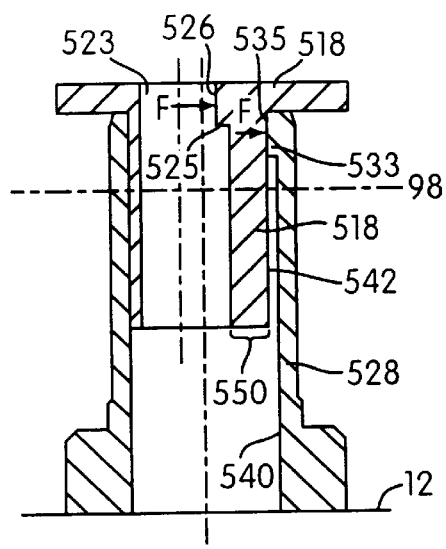
FIG. 7 is a longitudinal sectional view generally depicting an installation shaft and a pivot shaft of a sixth embodiment of a tensioner in accordance with the present invention.

Referring to FIG. 7, an installation shaft 518 and a pivot shaft 528 are depicted. An eccentric bolt engagement hole 523 is disposed in the top of the installation shaft 518. The hole 523 is partially defined by a radially inwardly extending portion 525 of the installation shaft. Portion 525 defines a surface 526 which engages the mounting bolt. An eccentric radially inwardly projecting upper portion 533 of the pivot shaft 528 defines a radially inwardly facing surface 535. Rotating the installation shaft 518 to move the contact surface 525 of the installation shaft 518 toward the belt directs the installation force F from the mounting bolt to the inner surface 526 of the installation shaft 518 and then from the outside surface 542 of the installation shaft 518 to the inside surface 535 of the reduced diameter upper portion 533 of the pivot shaft 528. The installation force is thereby applied at or above the belt centerline plane 98 in accordance with the invention.

Figure 8:
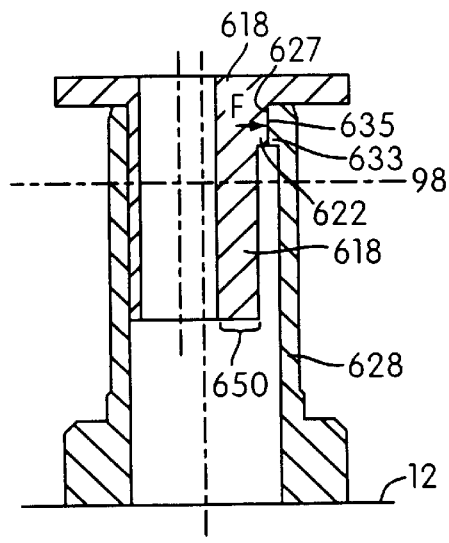
FIG. 8 is a longitudinal sectional view generally depicting an installation shaft and a pivot shaft of a seventh embodiment of a tensioner in accordance with the present invention.

Referring to FIG. 8, an installation shaft 618 and a pivot shaft 628 are depicted. When the installation shaft 618 is rotated to move its outer lateral surface 627 toward the belt, the installation force F is directed from outer lateral surface 627 of an eccentric radially outwardly projecting portion 622 of the installation shaft 618 to the inwardly facing surface 627 of a reduced diameter upper portion 633 of a pivot shaft 628. These surfaces are disposed in surface-to-surface sealed relation with each other and are disposed at or above the belt centerline plane 98 in accordance with the invention.

Figure 9:
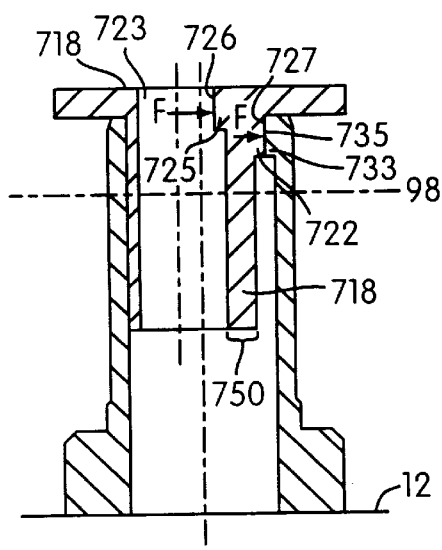
FIG. 9 is a longitudinal sectional view generally depicting an installation shaft and a pivot shaft of an eighth embodiment of a tensioner in accordance with the present invention.

Referring particularly to FIG. 9, an installation shaft 718 and a pivot shaft 728 are indicated. An eccentric bolt hole 723 is disposed in the top of the installation shaft 718 and a radially outwardly projecting upper portion 722 of the installation shaft 718 is indicated. A radially inwardly projecting upper portion 733 of pivot shaft 728 is also shown. When a laterally projecting portion 727 of installation shaft 718 is rotated toward the belt, the installation force F is applied from the mounting bolt to the inside surface 726 of a radially inwardly extending portion 725 of the installation shaft 718, then from the outside lateral surface 727 of the eccentric wider diameter portion 722 of the installation shaft 718 to the interior surface 735 of the reduced diameter eccentric upper portion 733 of the pivot shaft 728. The installation force is thereby applied at or above the belt centerline plane 98 in accordance with the invention.

Figure 10:
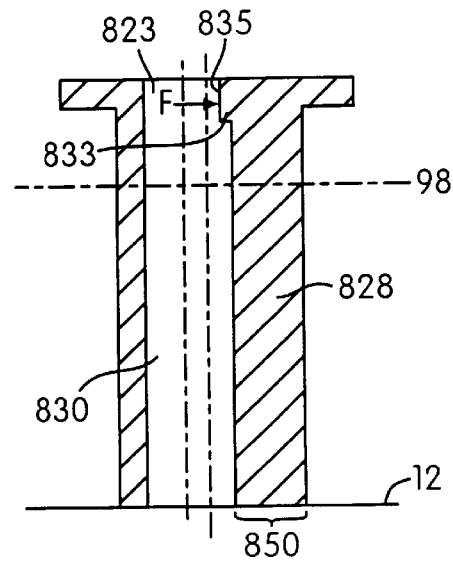
FIG. 10 is a longitudinal sectional view generally depicting a pivot shaft of a ninth embodiment of a tensioner in accordance with the present invention.

Referring to FIG. 10, an eccentric installation pivot shaft 828 is depicted. This pivot shaft 828 also acts as the installation shaft because of an eccentric bolt hole 823 (eccentric with respect to outside surface 831 of the pivot shaft) and the tensioner arm is mounted on the pivot shaft directly (with a bearing therebetween). The pivot shaft 828 has an eccentric bore 830. The eccentric bolt hole 823 is disposed in the top of the pivot shaft 828, creating a radially inwardly projecting upper portion 833 with an inwardly facing surface 835. During installation, the pivot shaft 828 is rotated to bring the thicker wall portion 850 of the pivot shaft 828 toward the belt. This rotation causes the installation force F to be applied directly from the mounting bolt to the interior lateral face 835 of the radially inwardly projecting upper portion 833 of the pivot shaft 828. The installation force F is thereby applied at or above the belt centerline plane 98 in accordance with the invention and tilting is minimized.

Referring to FIG. 11, a top view of the installation shaft 118 shown in FIG. 3 is depicted. FIG. 11 shows the eccentric disposition of the bolt hole 123 and installation shaft bore 119 with respect to each other and to the main cylindrical portion 120 of the installation shaft 118. FIG. 11 also shows the circumferential extent of the projecting wall 125 generally defining the surface 126. When the installation shaft 118 is rotated during installation to move the thicker wall portion 150 toward the belt and thereby apply tensioning force to the belt, surface 126 receives the installation force F horizontally from the mounting bolt at or above the belt centerline plane 98 and in accordance with the invention.

FIG. 12 is a longitudinal sectional view of the installation shaft 118 depicted in FIG. 11 (and FIG. 3) and shows better the relative dispositions of the axes of the installation shaft 118, the installation shaft bore 119, and the bolt hole 123.

Referring to FIG. 13, a top view of an installation shaft 918 is indicated and shows the concentric disposition of a bolt hole 923 with respect to the bore 919 of installation shaft 918. FIG. 14 is a longitudinal sectional view along the line 14—14 in FIG. 13 and, better indicates the radially inwardly projecting ledge 915 surrounding the concentric bolt hole 923. The ledge 915 projects an equal radial extent inwardly around the entire circumference of the bolt hole 923. When the installation shaft 918 is rotated to move the thicker wall portion 950 toward the belt, the installation force is directed from the mounting bolt to the inwardly laterally facing surface 925 of the ledge 915 defining the bolt hole 923 at the top of the installation shaft 918. The installation force is applied above the belt centerline plane 98 in accordance with the invention.

FIGS. 13 and 14 demonstrate that bolt hole 923 can be concentric with the installation shaft bore 919 and still produce the effect of having the tilt counteracting force F acting surface disposed at or above the belt center line.

In the above embodiments, the pivot shaft contacts the installation shaft at a first contact portion opposing the belt load force (e.g., at surface 38 in FIG. 2, surface 142 in FIG. 3, surface 238 in FIG. 4, etc.) and the installation shaft contacts the mounting bolt at a second contact portion opposing the belt load force (e.g., at surface 23 in FIG. 2; 126 in FIG. 3, etc.). Preferably, either one, or both of the first and second contact portions are limited to a location on one side of the belt centerline plane, which side is remote from the motor vehicle engine. It is also preferable for the installation shaft to have a portion thereof disposed closer to the motor vehicle engine than one or both of the first and second contact portions that oppose the belt load force, as discussed previously (for example) with regard to FIG. 2, wherein portion 20 of shaft 18 is closer to the engine surface 12 than upper eccentric portion 22.

It is also preferable in the above embodiments for either one or both of the first and second contact portions to be spaced a distance from the belt centerline plane, which distance is at least 7% of the distance between the belt centerline plane and the tensioner mounting surface of the engine. For example, in FIG. 2, distance a is preferably at least 7% of distance b.

Figure 34:
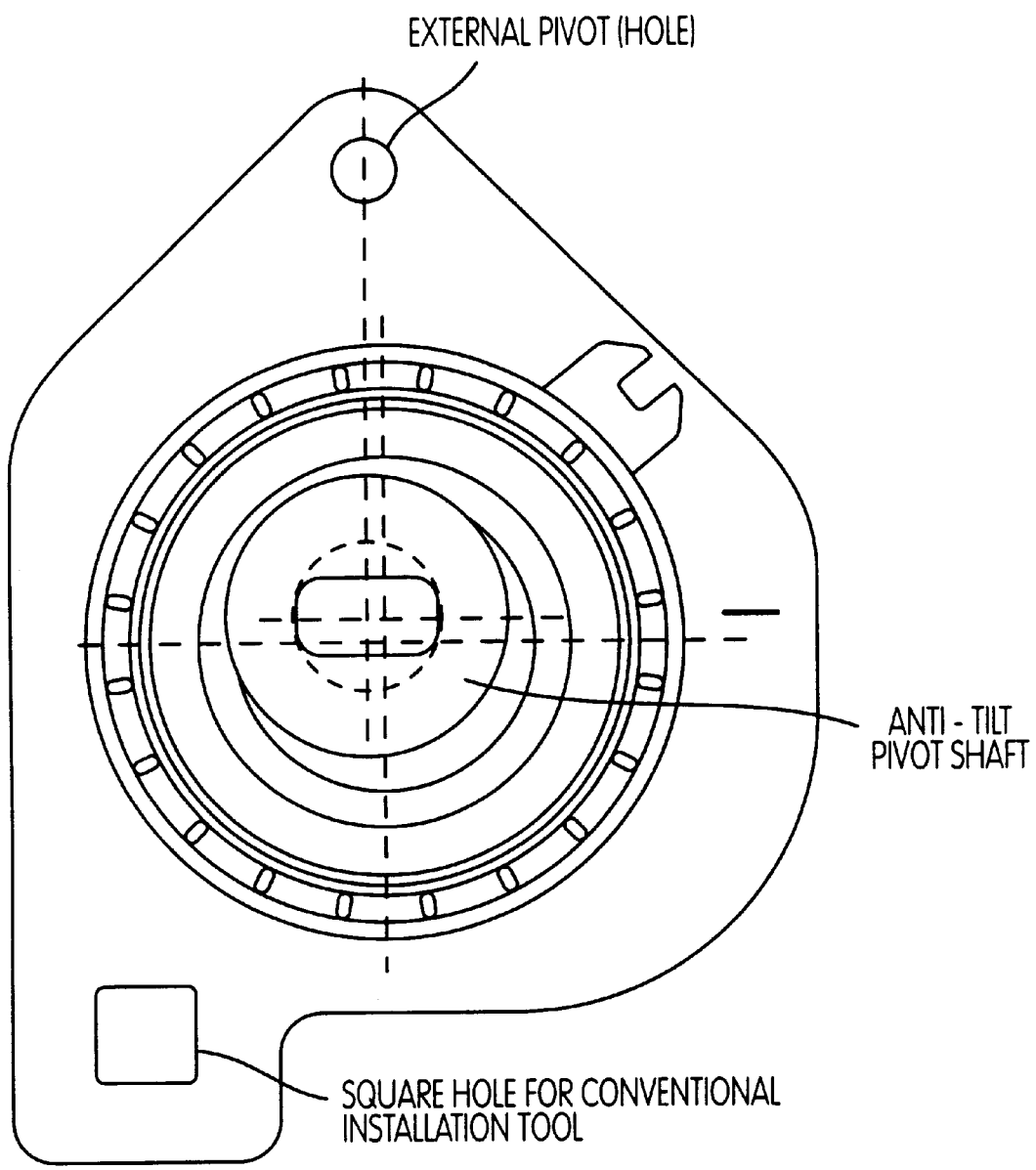
FIG. 34 is a plan view of a belt tensioner utilizing an external pivot used for installation and that can be adapted to employ an anti-tilt device in accordance with the present invention.

Another category of belt tensioner in accordance with the present invention includes tensioners with an external installation pivot. Such tensioners utilize an arcuate installation stroke. One such tensioner which would utilize the anti-tilt devices (e.g., see FIGS. 15–24) in accordance with the present invention is illustrated in FIG. 34.

Known methods to apply an installation force to a tensioner with an external installation pivot include use of a square or hexagonal hole formed into the base of the tensioner to apply installation torque, or the presence of a contact face on the base of the tensioner on which a horizontal force can be applied to push the tensioner against the belt. With both methods, the installation force is applied well below the belt centerline plane, the acting location of the hub load. Consequently, the hub load causes tilting of the tensioner as the installation force is applied to slide the tensioner toward and into tensioning engagement with the belt.

Tilting also occurs in the case of conventional linear installation stroke tensioner designs that rely on horizontal installation forces being applied to the base of the tensioner and well below the hub load level, which is at the belt centerline plane.

Examples of anti-tilt force arrangements for tensioners with a linear installation stroke or an external pivoted arcuate installation stroke in accordance with the present invention are represented in FIGS. 15–24. These tensioners are placed in tensioning engagement with a belt by sliding the entire tensioner toward the belt by application of an installation force parallel to and at or above the belt centerline plane; or by application of an installation force that may be applied parallel to the belt centerline plane, but with another force component perpendicular or nearly perpendicular to the belt centerline plane and toward the tensioner mounting surface in such a way that the resulting forces to the tensioner assembly will create a torque that will oppose the torque created by the hub load. The two force components can be separate forces acting on different locations of the tensioner, or two separate vectors of one force acting non-parallel to the belt centerline plane (e.g., generally at an angle that is directed both against the hub load and toward the tensioner mounting surface, or against the hub load and away from the tensioner mounting surface). It will be appreciated from the depicted tensioner embodiments of FIGS. 17, 18 and 21, to which the installation force is not applied parallel to the belt centerline plane, that this arrangement results in more torque opposing the tilting of a tensioner than would normally result from applying the installation force parallel to the belt load, because the obliquely applied force presents a greater moment arm between the line of application of the force and the point about which the tensioner will tend to tilt which is at the interface of the tensioner base and mounting surface.

Figure 15:
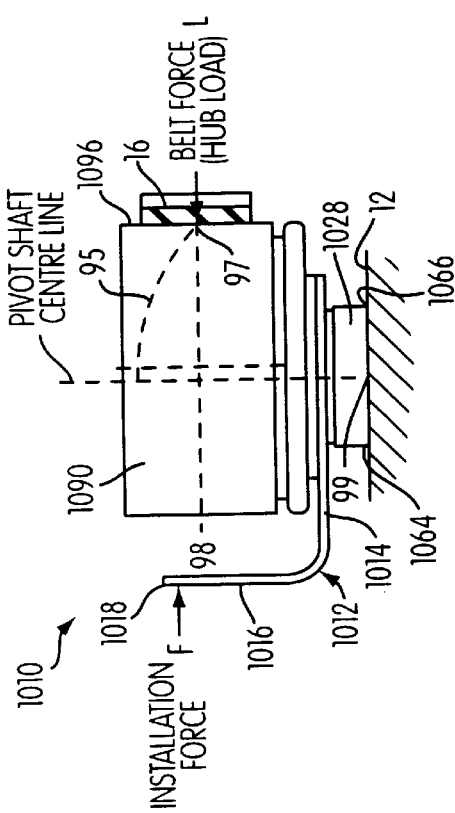
FIG. 15 is a side plan view of a tensioner with an external installation pivot or linear installation stroke tensioner in accordance with an eleventh embodiment of the present invention.

Referring particularly to FIG. 15, a side plan view of a tensioner 1010 with a base plate 1012 (which, in the case of an external pivot tensioner, also serves or may be considered as an external installation pivot member) in accordance with the present invention is depicted. A belt 16 is shown in operational relation with the belt tensioner pulley 1090. One end of a pivot shaft 1028 is engaged with the tensioner mounting surface 12. Between the pulley 1090 and mounting surface 12, the base plate 1012 comprises a radially outwardly extending extension portion or member 1014. The extension member 1014 bends away from surface 12 when extended radially past belt engaging surface 1096 of the pulley 1090 to become an installation engagement portion 1016, which extends away from surface 12 to a position slightly above the belt centerline plane 98, and terminates at an engagement tip 1018. In accordance with the invention, the installation force F is applied by the operator with a tool to the engagement tip 1018 of the engagement portion 1016 of the external installation pivot member 1012 in a direction opposite to the hub load L (to the right in FIG. 15) and slightly above the belt centerline plane 98, minimizing tilting of the tensioner 1010 along a curving tilt path 95 (dotted line starting at intersection 97 of belt 16 and pulley surface 1096) counterclockwise generally around the pivot point 99 as the tensioner 1010 is forced against the hub load L by the installation force F. It should be understood that in all the embodiments disclosed herein, that pivot point 99 is used for convenience of description, and that the tensioner actually pivots more generally about the outer edges of the tensioner member which is in contact with the engine mounting surface. For example, in FIG. 15, the tensioner 1010 would rock back and forth on outer edges 1064 and 1066, depending on the tilting direction.

Figure 16:
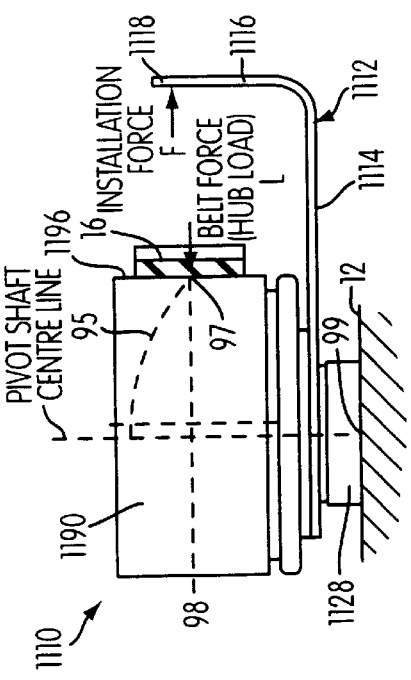
FIG. 16 is a side plan view of a tensioner with an external installation pivot or linear installation stroke tensioner in accordance with a twelfth embodiment of the present invention.

Referring to FIG. 16, a tensioner 1110 is depicted with a configuration similar to that of the embodiment in FIG. 15, except the installation engagement portion 1116 and engagement tip 1118 of the base plate 1112 are disposed radially farther from the pulley 1190 than in FIG. 15. In FIG. 16, the base plate 1112 is arranged on the same side of the tensioner 1110 as belt 16. Thus, to counteract the installation tilting force, it is necessary to pull the inside surface of engagement tip 1118 away from the tensioner 1110 and belt 16 while installing the tensioner, instead of applying a pushing installation force F on the outside surface of the engagement tip toward the belt 16 as in the previous embodiment. The installation force F applied by the operator with a tool in FIG. 16 is applied parallel to and above the belt centerline plane 98 and achieves the same result as described with FIG. 15, i.e., tilting of the tensioner by the belt force is reduced or eliminated while the tensioning force F is applied to oppose the hub load or belt load force L.

Figure 17:
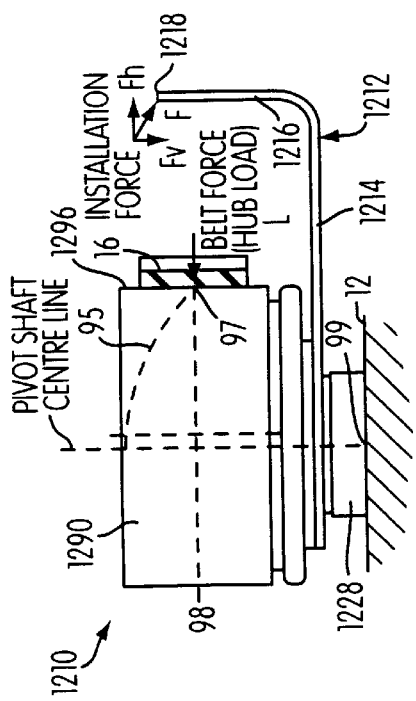
FIG. 17 is a side plan view of a tensioner identical to the embodiment of FIG. 16 except that the installation force is being applied in a different direction in accordance with the method of a thirteenth embodiment of the present invention.

The tensioner embodiment 1210 of FIG. 17 is identical to that of FIG. 16, but the installation force F applied by the operator is directed to the engagement tip 1218, which is above the belt centerline plane 98, not parallel to the belt load, but obliquely away from the pulley 1290 and downward toward the tensioner mounting surface 12. This obliquely applied installation force F has two components as seen in FIG. 17. A horizontal component Fh opposes the hub load L, while being parallel to and just above the belt centerline plane 98, and a vertical component Fv acts downward toward the tensioner mounting surface 12. Together these components reduce or eliminate tilting of the tensioner 1210 caused by the belt force about a pivot point 99 at the area of engagement of the pivot shaft 1228 and tensioner mounting surface 12 during installation. As noted previously, the tendency of the tensioner 1210 to tilt with the hub load L (counterclockwise along dashed line 95) around the pivot point 99, is better opposed by the obliquely applied installation force F that offers more torque against the tilting force, because of a greater moment arm between the direction of the installation force and the pivot point 99 than is presented by the strictly horizontally applied installation force as in FIG. 16, providing the force contact point is at the same height in both cases.

In each of the embodiments described in the present application, it may be desirable to force the tensioner beyond perpendicular relation to the engine mounting surface so that it actually tilts towards the belt during installation. This may be desirable, for example, when installing an old, used and stretched belt using the existing new belt installation index marks or when—in strongly damped tensioners—the hysteresis of the tensioner (arm) is considerably high causing it to drag well behind its dynamic position during the installation process when nearly static installation forces are applied to the tensioner. This can be accomplished (1) with structure internal to the tensioner by providing the contact point for the horizontal installation force far enough from the engine mounting surface to add additional tilting torque that will tilt the tensioner beyond perpendicular relative to the engine so that it tilts towards the belt, or (2) for an externally applied tilting force, by applying a manual tilting force large enough to tilt the tensioner away from the belt.

Figure 18:
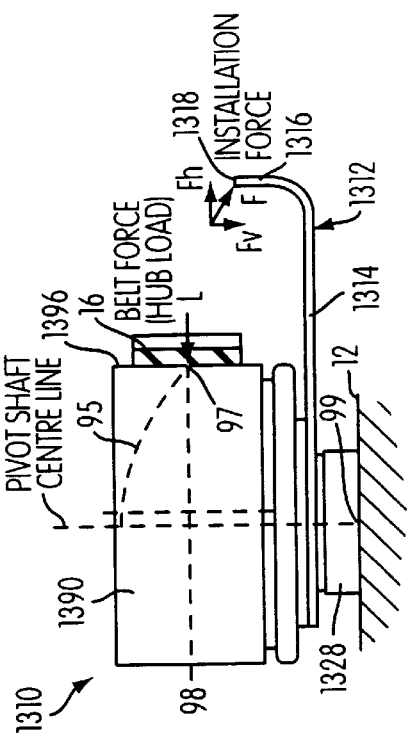
FIG. 18 is a side plan view of a tensioner with an external installation pivot or linear installation stroke tensioner in accordance with a fourteenth embodiment of the present invention.

Referring to FIG. 18, a tensioner 1310 is depicted similar to that in FIG. 17, except an installation engagement portion 1316 of a base plate/external installation pivot member 1312 does not extend to the belt centerline plane 98. The installation force F is applied in the same oblique manner as with the embodiment of FIG. 17 and has a horizontal component Fh directed parallel to and below the belt centerline plane 98 and against the hub load L direction, and a vertical component Fv directed toward the tensioner mounting surface 12. The force components acting together create torque that opposes and minimizes tilting of the tensioner 1310, despite the fact that the installation force F is applied below the belt centerline plane 98.

Figure 19:
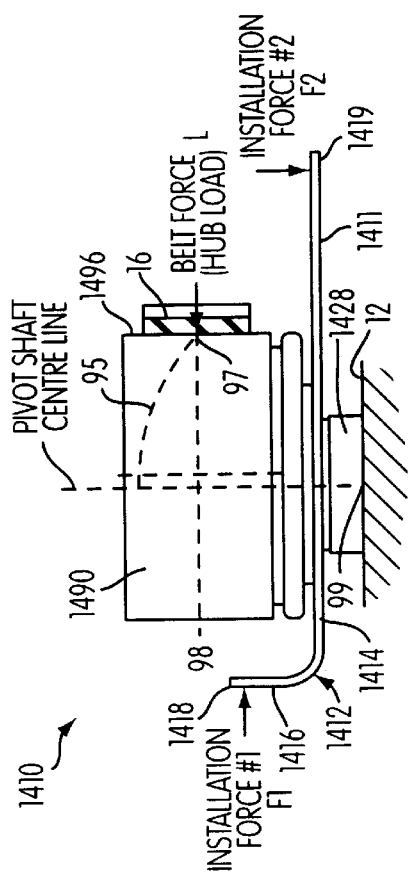
FIG. 19 is a side plan view of a tensioner with an external installation pivot or linear installation stroke tensioner modified for simultaneous application of two separate installation forces in accordance with a fifteenth embodiment of the present invention.

The tensioner embodiment 1410 of FIG. 19 has a base plate/extension portion 1414 having an engagement portion 1416 extending just below the belt centerline plane 98. A horizontal auxiliary extension 1411 extends in the diametrically opposite direction. In this tensioner embodiment 1410, installation forces are to be applied to two separate locations simultaneously (see force component vectors F1 and F2). The first force component F1 is applied horizontally as viewed in FIG. 19 to an engagement tip 1418 of the engagement portion 1416 of the external installation pivot 1412 and is applied directly opposite to the direction of the hub load L. The second force component F2 is applied vertically downward to an engagement tip 1419 of the auxiliary base extension 1411 and is therefore directed perpendicular to the hub load L and toward the tensioner mounting surface 12. These separate installation forces are both applied below the belt centerline plane 98, but act together as components of a single installation force F to provide a torque that minimizes or totally eliminates tilting of the tensioner 1410 about the pivot point 99 during installation.

Figure 20:
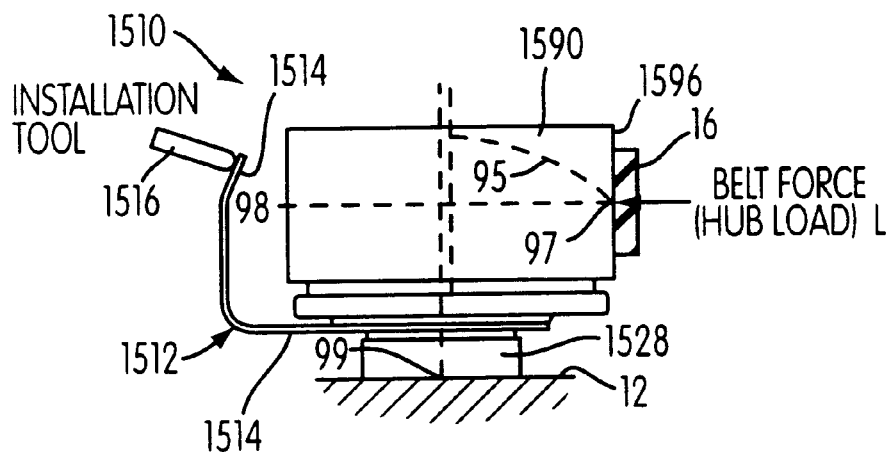
FIG. 20 is a side plan view of a tensioner with an external installation pivot or linear installation stroke tensioner also indicating the disposition of an installation tool in accordance with a sixteenth embodiment of the present invention.

It should be appreciated that, in accordance with the invention, there are two ways of controlling the direction of the installation force, or a combination thereof. In the first way, the direction of the load carrying surface, so as to enable a perpendicular external force to be applied thereto. For example, FIG. 20 depicts a tensioner 1510 of an embodiment similar to that depicted by FIG. 15, and also illustrates an installation pushing tool 1516 in pushing engagement with a pushing contact tip 1514 of the base plate 1512. The pushing contact tip 1514 is similar to the engagement tips illustrated previously, but is bent slightly toward tensioner pulley 1590. As a result, the tip 1514 provides a surface that can be best engaged by a tool in a perpendicular direction to the surface at the point where the installation force F is applied. Because the tool 1516, when in pushing engagement with the pushing contact tip 1514, is not restricted in movement with respect to the tip 1514, the installation force F is directed perpendicular to the load carrying surface 1590 of the tensioner 1510. In FIG. 20 the installation force F is applied obliquely and has two components. The horizontal component is directed parallel to, and against the hub load L. A vertical component is directed toward the tensioner mounting surface 12. Here, the contact tip 1514 is above the belt centerline plane 98. The result is minimal tilting of the tensioner 1510 in accordance with the invention.

Figure 21:
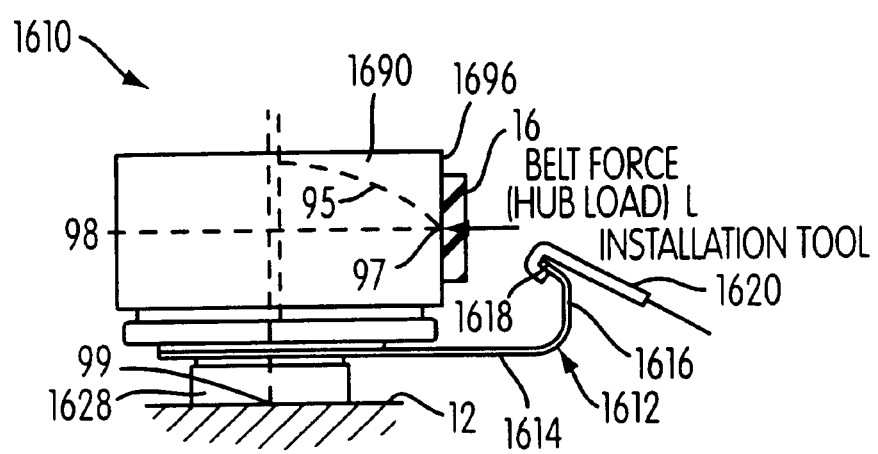
FIG. 21 is a side plan view of a tensioner with an external installation pivot or linear installation stroke tensioner also indicating the disposition of an installation tool in accordance with a seventeenth embodiment of the present invention.

FIG. 21 illustrates the second way of controlling the direction of an installation force F applied to a linear installation stroke tensioner or external installation pivot tensioner in accordance with the present invention; by controlling the direction of the movement of the installation tool. The tensioner embodiment 1610 depicted by FIG. 21 is very similar to that depicted by FIG. 18, except it has a base plate section 1612 with an engagement portion 1616 that terminates with it bending backward towards the pulley 1690, thereby creating a pulling contact tip 1618. A pulling installation tool 1620 is depicted in pulling engagement with the pulling contact tip 1618. With the pulling installation tool 1620 in pulling engagement with the pulling contact tip 1618, the direction of the installation force F is solely affected by the pulling tool 1620. In FIG. 21, as with the embodiment of FIG. 18, an oblique pulling installation force is applied. It the embodiment shown in FIG. 21, the force F is applied below the belt centerline plane 98, and the two components of this force act together as previously described, to create torque that minimizes tilting of the tensioner 1610 during installation.

Figure 22:
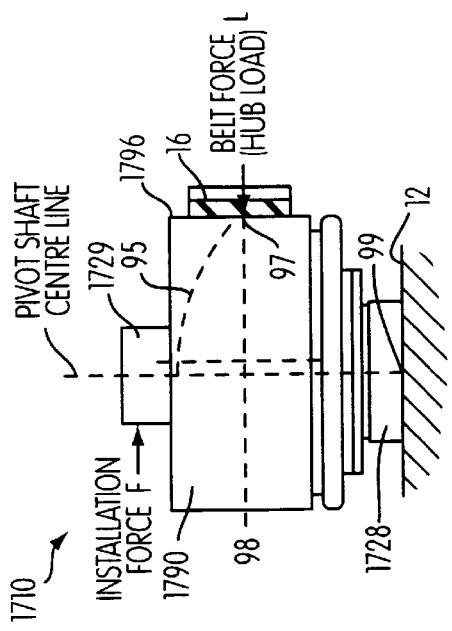
FIG. 22 is a side plan view of a tensioner with an external installation pivot or linear installation stroke tensioner in accordance with an eighteenth embodiment of the present invention.
Figure 24:
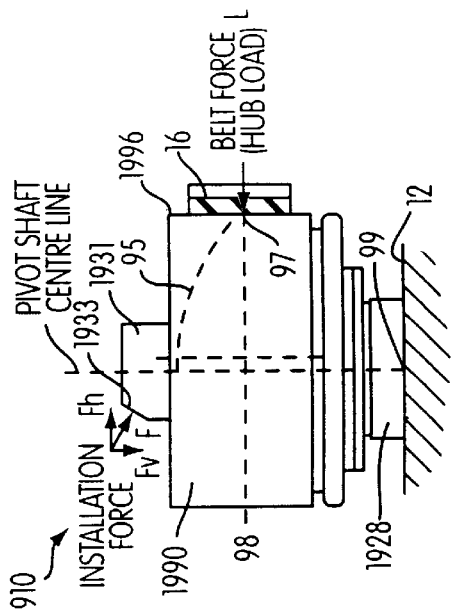
FIG. 24 is a side plan view of a tensioner with an external installation pivot or linear installation stroke tensioner in accordance with a twentieth embodiment of the present invention.
Figure 23:
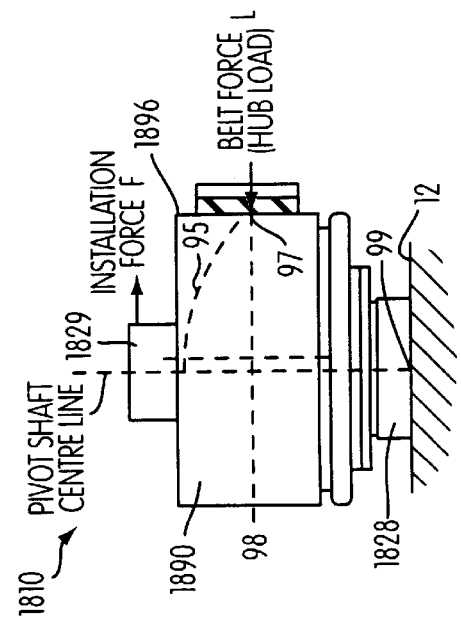
FIG. 23 depicts a side plan view of a tensioner identical to the embodiment of FIG. 22 except the installation force is being applied in a pulling manner (as opposed to pushing) in accordance with the method of a nineteenth embodiment of the present invention.

The tensioner embodiments depicted in FIGS. 22, 23, and 24 have a different type of installation force contact point from those shown in the preceding embodiments. In the present three examples, the pivot shaft extends (as viewed in the figures) beyond the side of the pulley facing away from the mounting surface 12, and the exposed pivot shaft top portion serves as the installation force contact point member, receiving the installation force F.

In FIG. 22, the installation force F is applied horizontally to push against a top portion 1729 of a pivot shaft 1728 of the tensioner 1710 thereby sliding the tensioner 1710, into tensioning engagement with the belt 16. The installation force F thus applied is directed parallel to and above the belt centerline plane 98 and against the hub load L. Tilting of the tensioner 1710 caused by hub load or belt load is reduced or eliminated during application of the installation force F in this manner which is in accordance with the invention.

The tensioner embodiment 1810 of FIG. 23 is identical to that of FIG. 22, but the top portion 1829 of the pivot shaft 1828 of the tensioner 1810 is hooked or otherwise grasped by a pulling installation tool to apply an installation force F to slide the tensioner 1810 toward and into engagement with the belt 16. The installation force F is thus directed against the hub load L parallel to and above the belt centerline plane 98, and, in accordance with the invention, minimal tilting of the tensioner occurs.

The tensioner embodiment 1910 in FIG. 24 is very similar to the preceding two tensioner embodiments, except that the pivot shaft 1928 has a top portion 1931 with one side tapered in a manner presenting a tapered pushing surface 1933 generally perpendicular to the preferred direction of a pushing installation force F oblique to the direction of hub load L. The oblique installation force F for the tensioner embodiment 1910 has a horizontal component Fh directed against the hub load L and above and parallel to the belt centerline plane 98, and a vertical component Fv directed toward the tensioner mounting surface 12. These force components act together to create torque which reduces or eliminates tilting caused by hub load when the tensioner 1910 is forced against and into tensioning engagement with the belt 16 in opposition to the hub load L.

Referring to FIGS. 25 to 30, a more detailed design of a linear installation stroke tensioner 2010 is depicted with a base plate member adapted to be installed by an installation tool (shown in FIG. 28) that applies the installation force F to move the tensioner 2010 in a linear direction and into tensioning engagement with the belt 16 in accordance with the invention, and in a similar way as in FIG. 18.

Figure 25:
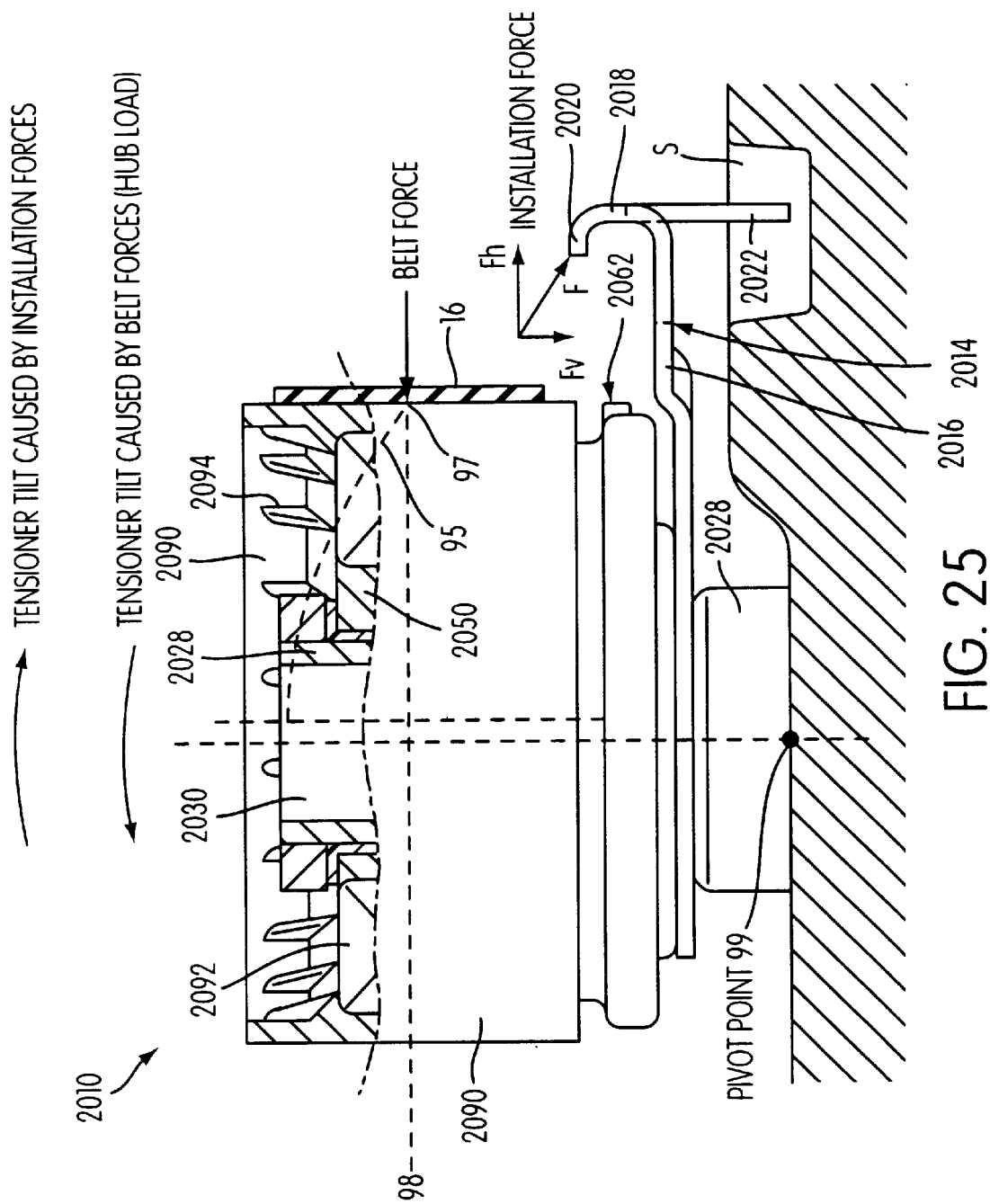
FIG. 25 is a partial section side view of a belt tensioner with a linear installation stroke in accordance with a twenty-first embodiment of the present invention.

FIG. 25 is a partial section side view of a tensioner embodiment 2010 having a linear installation stroke. The base plate 2014 has a first portion 2016 that extends generally parallel to tensioner mounting surface 12 and beyond the radial extent of a pulley 2090 on the belt engaging side of the pulley 2090. A section of the base plate 2014 then bends away from the surface 12, forming a support rim 2018 that extends a relatively short distance before bending back toward the tensioner to provide a tool engagement lip 2020. A guide tongue or protrusion 2022 is cut-away from a central portion of the support rim 2018 and extends into a guide slot S in the tensioner mounting surface 12 and helps define the linear stroke path of the tensioner during installation. The installation force F that slides the tensioner 2010 into tensioning engagement with the belt 16 is applied with a tool in a manner to be illustrated in FIG. 28. The cut out from rim portion 2018 leaves an opening or slot 2024 in the portion 2016 of the base plate 2014.

Figure 26:
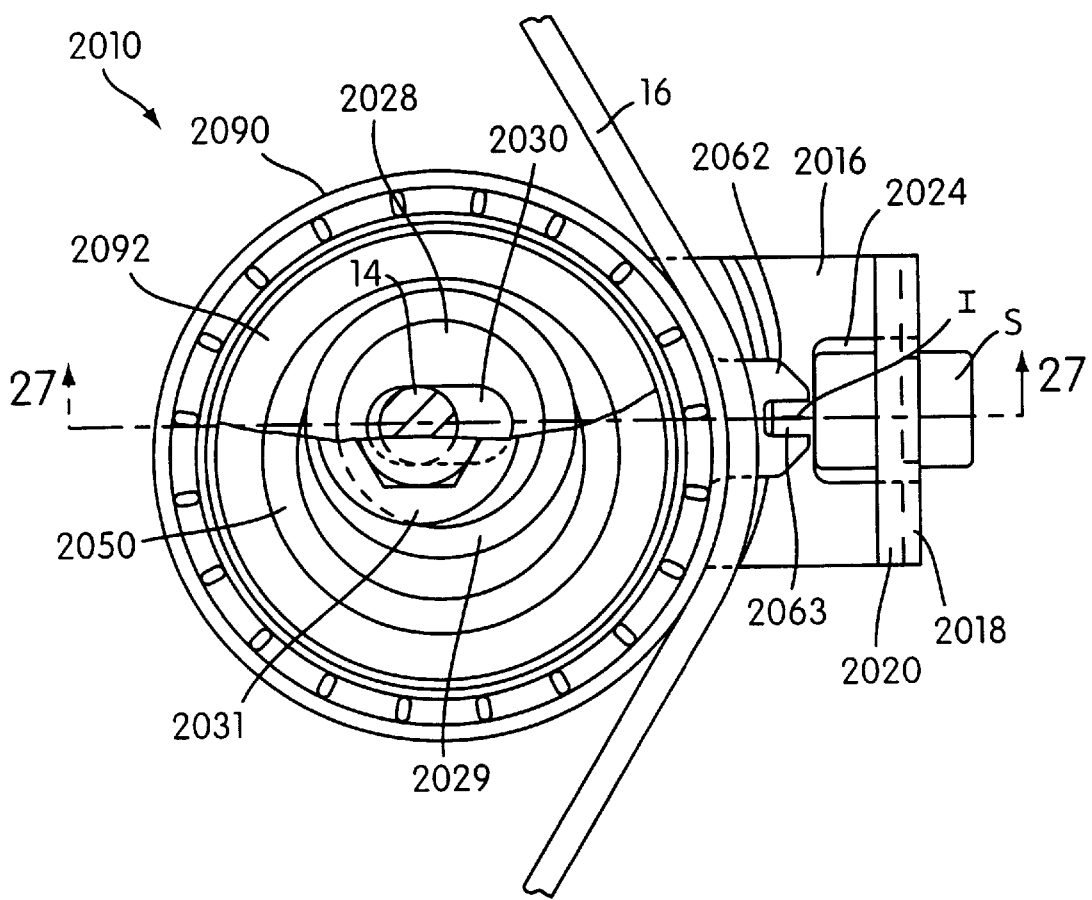
FIG. 26 is a partial section top view of the belt tensioner embodiment in FIG. 25, the partial section being taken along line 26—26 of FIG. 27.
Figure 27:
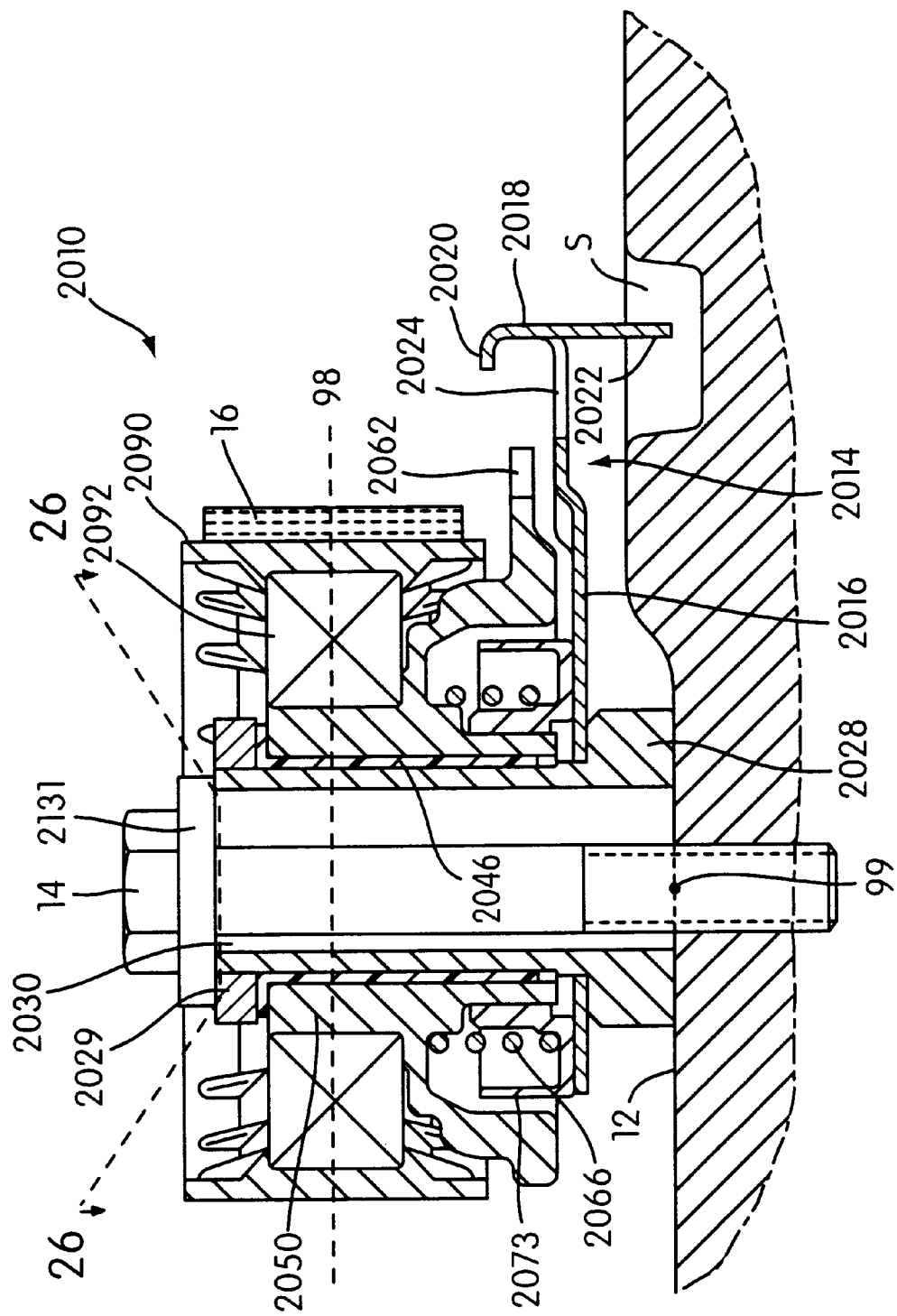
FIG. 27 is a longitudinal sectional view taken along the line 27—27 of FIG. 26.

As it can be appreciated from FIGS. 26 and 27, the tensioner 2010 has a pivot shaft 2028 having an exterior surface that provides a mounting surface for a sleeve bearing 2076, which in turn mounts an eccentric lever arm 2050. The pivot shaft 2028 has a longitudinal bore 2030 therethrough for receiving the mounting bolt 14. As shown, the bore 2030 has an oblong or elongated lateral cross-section that permits the tensioner 2010 to slide along the mounting surface 12 relative to bolt 14 and towards the belt 16 during installation of the tensioner. A top washer 2029 is fixed at the pivot shaft 2028. The tensioner 2010 is forced into engagement with the belt 16 by use of a tool 2126 as will be described. The cooperation of the laterally elongated bore 2030 with the bolt 14 and the cooperation of the guide tongue 2022 with the slot S form linear guiding structure that provide surfaces of interengagement between the belt tensioner and the motor vehicle engine to limit movement of the pivot shaft 2028 to linear movement toward the belt 16 during the installation process. It should be understood that the linear guiding structure discussed above is merely one of numerous structural arrangements that can be used. In essence, any cooperative surfaces between the belt tensioner and engine 12 that allows the tensioner to move relative to the bolt 14, and which restricts such movement to linear movement would satisfy the contemplated scope of the linear guiding structure. The more preferred linear guiding structures comprise some combination of interengaging surfaces of slot(s) and projection(s)/bolt(s); although a single elongated sliding track with cooperative surfaces between the tensioner and engine is also preferred. In FIG. 27, it can be appreciated the slot S may be replaced by a protrusion that can be received in a slot in the base plate 2014.

Each of the tensioner embodiments described herein which have a linear installation stroke or movement are preferably provided with this elongated slot in the pivot shaft to permit linear movement of the tensioner towards the tension during installation. After the tensioner is moved linearly into tensioning engagement with the belt, the bolt 14 is tightened to fix the pivot shaft in place.

In FIGS. 26 and 27, a pointer 2062 is shown in the after-installation position where it is aligned with the indication I (as seen in FIG. 26), indicating that the tensioner 2010 is in correct predetermined position with respect to the belt 16. The method for achieving correct position was discussed in relation to the embodiment of FIG. 1. In FIG. 25 the pointer 2062 is in a before-installation position, not aligned with the indication I, and where only the tip of the pointer 2062 is evident.

Referring to FIG. 28 the tensioner embodiment 2010 of FIGS. 25, 26 and 27 is depicted with an installation tool 2026 engaging the base plate 2014 for installing the tensioner 2010. The installation tool 2026 can be a screwdriver or other rigid rod like device that can fit through the tool slot 2024 and into the slot S, and is to be used as a lever. With the bottom end of the installation tool 2026 resting at the corner formed by the bottom surface of the slot S, and the wall of the slot S closest to the tensioner 2010, the upper end of the tool 2026 is tilted away from the tensioner and downward (curved arrow in FIG. 28), causing the tool 2026 to engage the engagement lip 2020 of the external installation pivot 2014. The tool 2026 thus applies to the engagement lip 2020 the installation force F necessary to cause linear movement of the tensioner 2010 toward the belt 16 and into tensioning engagement with the belt 16. The installation force F thereby applied is non-parallel to the belt centerline plane 98 and is comprised of a horizontal force component Fh directed parallel to surface 12, below the belt centerline plane 98, and against the hub load L, and a vertical force component Fv directed downward toward the tensioner mounting surface 12. Together these components create an installation torque to oppose and minimize tilting of the tensioner 2110 about pivot point 99 during installation. FIG. 29 shows the pivot shaft bore 2030 linearly elongated to facilitate linear displacement of the tensioner 2010 relative to the mounting bolt 14 during application of the installation force F that slides the tensioner 2010 toward the belt.

Figure 31:
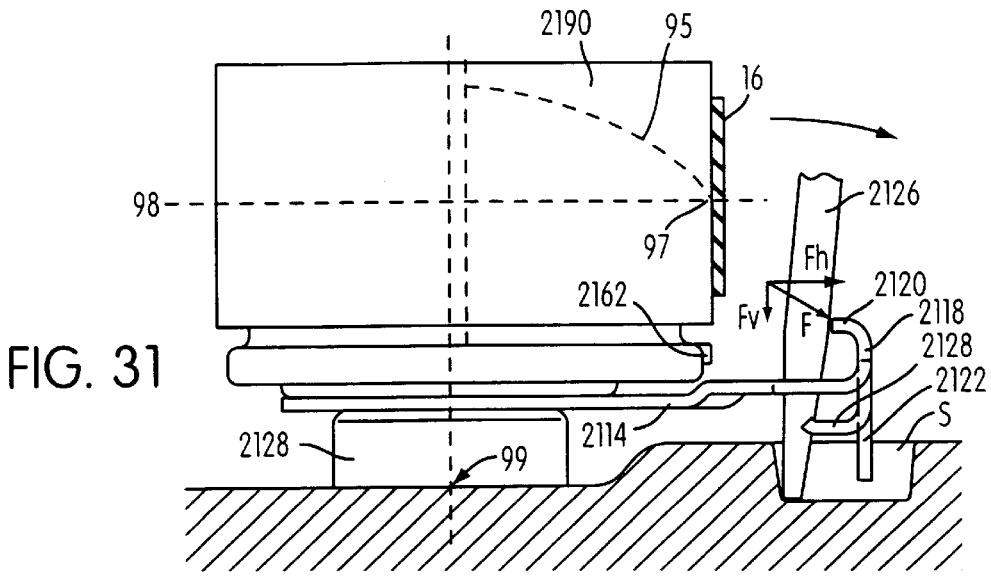
FIG. 31 is a side plan view of a belt tensioner with a linear installation stroke tensioner and depicting the disposition of an installation tool in accordance with a twenty-second embodiment of the present invention.
Figure 32:
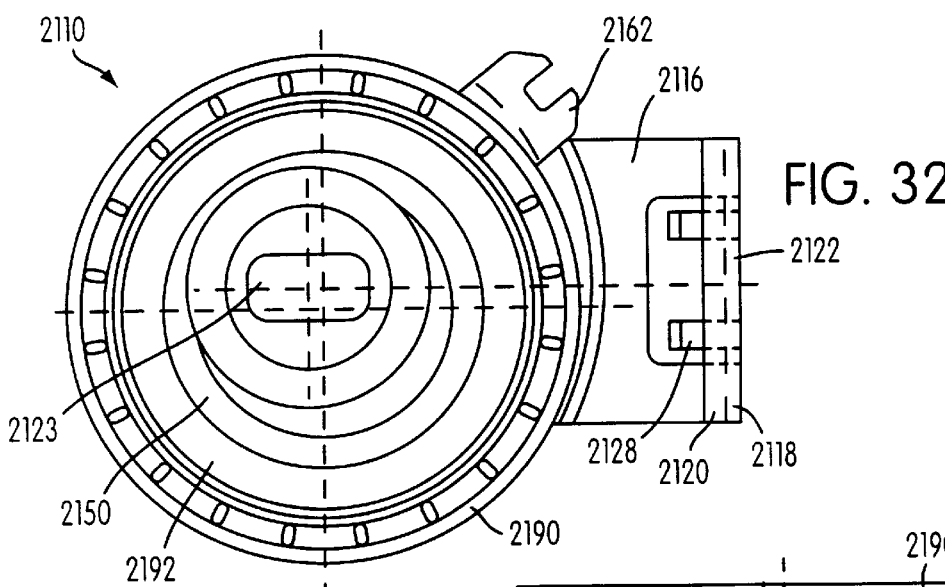
FIG. 32 is a top plan view of the tensioner embodiment depicted in FIG. 31.
Figure 33:
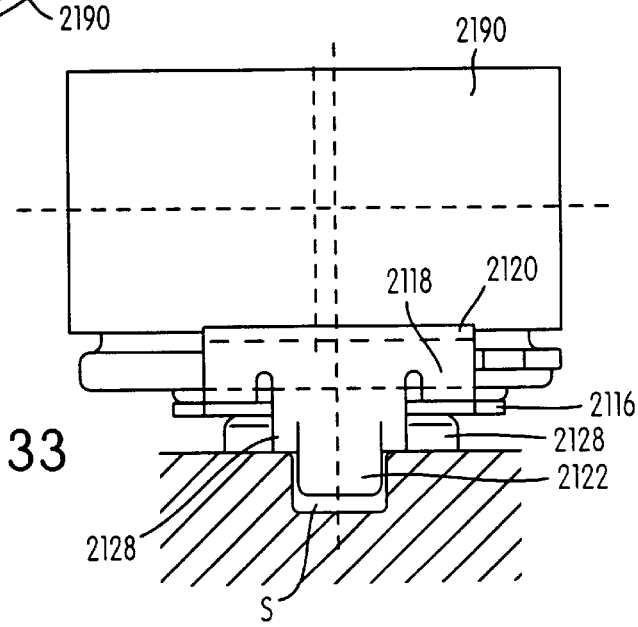
FIG. 33 is a right side view of the tensioner embodiment depicted in FIG. 31.

Referring particularly to FIGS. 31, 32 and 33, a tensioner embodiment 2110 similar to the preceding one is depicted. In FIGS. 31-33 however, the base plate 2114 includes a pair of parallel slide members 2128 that originate at the support rim 2118, and are disposed on opposite sides of guide tongue 2122. Slide members 2128 extend downwardly from support rim 2118, then extend horizontally toward the tensioner, then terminate in an upward curving tip. The bottom surfaces of the slide members 2128 are disposed in sliding surface-to-surface relation on the tensioner mounting surface 12, on opposite sides of the slot S. This gives additional structural support to the base plate 2114 during application of the installation force F, and particularly, support against the vertically downward component Fv (toward surface 12) of the installation force F applied by installation tool 2126. The installation force F is applied with the tool 2126 with the motion previously described, causing linear motion of the tensioner 2110 toward and into tensioning engagement with the belt 16. Use of the tool 2126 directs the installation force F nonparallel to the hub load L, with horizontal Fh and vertical Fv components that together create torque that opposes and minimizes tilting of the tensioner 2110 caused by the hub load L during installation. It should also be noted that if sliders such as 2128 are not provided, as in the case of the previously described tensioner 2010, the base plate 2114 could be designed to better carry the vertical component Fv of the installation force F by the use of thicker material sections or the addition of strengthening ribs and/or folds.

With regard to the linear stroke tensioners illustrated in FIGS. 25–33 and the external installation pivot tensioner of FIG. 34, the present invention contemplates that rather than requiring an external force towards the belt during installation, the force can be applied by structure that is internal or integral with the tensioner. This is exemplified by the camming structure arrangement illustrated and described by provisional application Ser. No. 60/105,681, which has been incorporated by reference in its entirety.

It will be appreciated that the objects of the present invention have been fully and effectively accomplished. The above description and appended drawings are preferred examples of the present invention, but are in no way intended to limit the scope of the invention. Thus, the present invention is directed to all embodiments that are within the spirit and scope of the following claims and equivalents thereof.

What is claimed:

1. A belt tensioner for a motor vehicle engine, comprising:
   a pivot shaft;
   an eccentric pivoted structure mounted for pivoted movement on the pivot shaft;
   a rotatable pulley member mounted for rotation on the eccentric pivoted structure;
   a spring constructed and arranged to bias the eccentric pivoted structure in a direction tending to force the pulley member into tensioning engagement with a belt trained about the pulley member when the belt tensioner has been installed on the motor vehicle engine;
   an eccentric installation shaft received within said pivot shaft,
   a mounting bolt constructed and arranged to extend through said installation shaft to secure said belt tensioner to the motor vehicle engine, said installation shaft being rotatable about said mounting bolt to move said pulley into tensioning engagement with said belt and to pre-load the spring to bias the eccentric pivoted structure;
   wherein a belt load force applied by said belt to said belt tensioner pulley is centered about a belt centerline plane bisecting a width of the belt;
   said pivot shaft contacting said installation shaft at a first contact portion opposing the belt load force, and said installation shaft contacting said mounting bolt at a second contact portion opposing the belt load force,
   at least one of said first and second contact portions being limited to a location on one side of said belt centerline plane remote from said motor vehicle engine,
   said installation shaft having a portion thereof disposed closer to said motor vehicle engine than said at least one of said first and second contact portions limited to said one side of the belt centerline plane.

2. The belt tensioner according to claim 1, wherein said installation shaft has an upper eccentric portion that engages an interior surface portion of said pivot shaft at a location opposing said belt load force and disposed on said one side of said belt centerline plane remote from the motor vehicle engine and constructing said first contact portion.

3. The belt tensioner according to claim 2, wherein said second contact portion comprises and area of contact between an inner surface portion of said installation shaft and an outer surface portion of said mounting belt, which area of contact extends on both sides of said belt centerline plane.

4. The belt tensioner according to claim 2, wherein said second contact portion comprises an area of contact between an inner surface portion of said installation shaft and an outer surface portion of said mounting bolt, which area of contact is limited to said one side of the belt centerline plane.

5. The belt tensioner according to claim 2, wherein said interior surface portion of said pivot shaft comprises a reduced diameter upper portion of said pivot shaft.

6. The belt tensioner according to claim 5, wherein said second contact portion comprises an area of contact between an inner surface portion of said installation shaft and an outer surface portion of said mounting bolt, which area of contact is limited to said one side of said belt centerline plane.

7. The belt tensioner according to claim 2, wherein said installation shaft has an upper eccentric portion that engages an exterior surface portion of said bolt at a location opposing said belt load force and disposed on said one side of said belt centerline plane remote from the motor vehicle engine and constituting said second contact portion.

8. The belt tensioner according to claim 7, wherein said first contact portion comprises an area of contact between an outer surface portion of said installation shaft and an inner surface portion of said pivot shaft, which area extends on both sides of said belt centerline plane.

9. The belt tensioner according to claim 7, wherein said first contact portion comprises an area of contact between an outer surface portion of said installation shaft and an inner surface portion of said pivot shaft, which area of contact is limited to said one side of said belt centerline plane.

10. The belt tensioner according to claim 9, wherein said outer surface portion of said installation shaft comprises an upper eccentric portion.

11. The belt tensioner according to claim 9, wherein said inner surface portion of said pivot shaft comprises a reduced diameter upper portion.

12. The belt tensioner according to claim 1, wherein said pivot shaft has a reduced diameter upper portion that engages an exterior surface portion of said installation shaft at a location opposing said belt load force and disposed on said one side of said belt centerline plane and constituting said first contact portion.

13. The belt tensioner according to claim 12, wherein said installation shaft has an inner surface portion that contacts an exterior surface of said mounting bolt on both sides of said belt centerline plane.

14. A method of installing a belt tensioner comprising a pivot shaft, a pivoted structure mounted on the pivot shaft, a rotatable pulley member mounted for rotation on the pivoted structure, a spring that biases the pivoted structure in a direction tending to force the pulley member into tensioning engagement with a belt when the belt tensioner is installed on a motor vehicle engine, said method comprising:
   mounting the belt tensioner on the motor vehicle engine with a mounting bolt;
   moving the pulley into forcible engagement with said belt so as to cause pivoting movement of said pivoted structure against the bias of said spring, the belt applying a counteracting belt load force to the pulley, said belt load force tending to tilt the tensioner; and
   applying an external force to said belt tensioner in a direction which tends to balance the belt load force so as to reduce or eliminate tilting of the tensioner during installation.

15. A method according to claim 14, wherein said mounting bolt is relatively loosely secured to the vehicle engine when the belt tensioner is being moved into tensioning engagement with the belt and when said external force is being applied, and wherein said mounting bolt is tightened after the pulley is moved into desired tensioning engagement with the belt.

16. A method according to claim 15, wherein said pivot shaft is movable relative to said mounting bolt in a linear direction towards said belt while the mounting bolt is relatively loosely secured to the vehicle engine, said belt tensioner further comprising inter-engaging structure that engages the motor vehicle engine and cooperates with said mounting bolt to limit movement of said pivot shaft relative to said mounting bolt to linear movement, then tightening said bolt to fix the pivot shaft relative to said bolt.

17. A method according to claim 15, wherein said belt tensioner includes an eccentric installation shaft rotatable about said mounting bolt, said method further comprising:

rotating said installation shaft about said mounting bolt so as to move the pulley into said forcible engagement with said belt so as to cause said pivoting movement of said pivoting structure against the bias of said spring.

18. A method according to claim 14, wherein said belt tensioner includes an eccentric installation shaft rotatable about said mounting bolt, said method further comprising:

rotating said installation shaft about said mounting bolt so as to move the pulley into said forcible engagement with said belt so as to cause said pivoting movement of said pivoting structure against the bias of said spring.

19. A belt tensioner for a motor vehicle engine, and constructed and arranged to be mounted on a mounting surface of aid motor vehicle engine, said belt tensioner comprising:

a pivot shaft;

an eccentric pivoted structure mounted for pivoted movement on the pivot shaft;

a rotatable pulley member mounted for rotation on the eccentric pivoted structure;

a spring constructed and arranged to bias the eccentric pivoting structure in a direction tending to force the pulley member into tensioning engagement with a belt trained about the pulley member when the belt tensioner has been installed on the motor vehicle engine;

an eccentric installation shaft received within said pivot shaft, a mounting bolt constructed and arranged to extend through said installation shaft to secure said belt tensioner to the motor vehicle engine, said installation shaft being rotatable about said mounting bolt to move said pulley into tensioning engagement with said belt and to pre-load the spring to bias the eccentric pivoting structure;

wherein a belt load force applied by said belt to said belt tensioner pulley is centered about a belt centerline plane bisecting a width of the belt;

said pivot shaft contacting said installation shaft at a first contact portion opposing the belt load force, and said installation shaft contacting said mounting bolt at a second contact portion opposing the belt load force, at least one of said first and second contact portions being limited to a location on one side of said belt centerline plane remote from said motor vehicle engine, wherein said at least one of said first and second contact portions is spaced a distance from said belt centerline plane, said distance being at least 7% of a distance between said belt centerline plane and the tensioner mounting surface of said motor vehicle engine.

20. A belt tensioner for a motor vehicle engine, comprising:

a pivot shaft;

an eccentric pivoted structure mounted for pivoted movement on the pivot shaft;

a rotatable pulley member mounted for rotation on the eccentric pivoted structure;

a spring constructed and arranged to bias the eccentric pivoted structure in a direction tending to force the rotatable pulley member into tensioning engagement with a belt trained about the pulley member;

a mounting bolt constructed and arranged to mount the belt tensioner on the motor vehicle engine, said pivot shaft being movable relative to said mounting bolt and towards said belt during a belt tensioner installation procedure; and linear guiding structure providing surfaces of interengagement between said belt tensioner and said motor vehicle engine to limit movement of the pivot shaft to linear movement toward the belt during the installation procedure.

21. A belt tensioner according to claim 20, wherein said linear guiding structure comprises:

an elongated slot disposed in one of said belt tensioner and said motor vehicle engine, and a protrusion extending into said slot and disposed on another of said belt tensioner and said motor vehicle engine.

22. A belt tensioner according to claim 21, wherein said elongated slot is in said motor vehicle engine and said protrusion is carried by said belt tensioner.

23. A belt tensioner according to claim 22, further comprising a base plate, said base plate having said protrusion received in said slot in said motor vehicle engine.

24. A belt tensioner according to claim 21, wherein said elongated slot is provided in said belt tensioner, and wherein said protrusion is provided by said motor vehicle engine.

25. A belt tensioner according to claim 24, further comprising a base plate, and wherein said elongated slot is provided in said base plate for receiving said protrusion from said motor vehicle engine.

26. A belt tensioner according to claim 21, wherein said linear guiding structure further comprises surface portions of interengagement between said mounting bolt and said pivot shaft, said pivot shaft having an elongated slot associate therewith for receiving said mounting bolt and permitting linear movement of said pivot shaft towards said belt.

27. A method of installing a belt tensioner comprising a pivot shaft, a pivoted structure mounted on the pivot shaft, a rotatable pulley member mounted for rotation on the pivoted structure, a spring that biases the pivoted structure in a direction tending to force the pulley member into tensioning engagement with a belt when the belt tensioner is installed on a motor vehicle engine, said method comprising:

mounting the belt tensioner on the motor vehicle engine with a relatively loose mounting bolt;

moving the pivot shaft in a substantially exactly linear manner towards said belt so that said pulley is moved into forcible engagement with said belt so as to cause pivoting movement of said pivoted structure against the bias of said spring, and after said tensioner is disposed in a predetermined tensioning relation with said belt, tightening said mounting bolt so as to fix said pivot shaft in place.

28. A method according to claim 27, further comprising applying an external force to said belt tensioner in a direction which tends to balance the belt load force so as to reduce or eliminate tilting of the tensioner as said pivot shaft is moved in said linear manner towards said belt.

29. A belt tensioner for a motor vehicle engine, comprising:

a pivot shaft;

an eccentric pivoted structure mounted for pivoted movement on the pivot shaft;

a rotatable pulley member mounted for rotation on the eccentric pivoted structure;

a spring constructed and arranged to bias the eccentric pivoted structure in a direction tending to force the pulley member into tensioning engagement with a belt trained about the pulley member when the belt tensioner has been installed on the motor vehicle engine;

an eccentric installation shaft received within said pivot shaft, a mounting bolt constructed and arranged to extend through said installation shaft to secure said belt tensioner to the motor vehicle engine, said installation shaft being rotatable about said mounting bolt to move said pulley into tensioning engagement with said belt and to pre-load the spring to bias the eccentric pivoting structure;

wherein a belt load force applied by said belt to said belt tensioner pulley is centered about a belt centerline plane bisecting a width of the belt;

said pivot shaft contacting said installation shaft at a first contact portion opposing the belt load force, and said installation shaft contacting said mounting bolt at a second contact portion opposing the belt load force, at least one of said first and second contact portions being limited to a location on one side of said belt centerline plane remote from said motor vehicle engine, and spaced a sufficient distance from said belt centerline plane so as to tilt the pivot shaft beyond a perpendicular relation with the engine, towards the belt.

30. A belt tensioner for a motor vehicle engine, comprising:

an eccentric installation pivot shaft;

an eccentric pivoted structure mounted for pivoted movement on the eccentric pivot shaft;

a rotatable pulley member mounted for rotation on the eccentric pivoted structure;

a spring constructed and arranged to bias the eccentric pivoted structure in a direction tending to force the pulley member into tensioning engagement with a belt trained about the pulley member when the belt tensioner has been installed on the motor vehicle engine;

a mounting bolt constructed and arranged to extend through said eccentric pivot shaft to secure said belt tensioner to the motor vehicle engine, said eccentric pivot shaft being rotatable about said mounting bolt to move said pulley into tensioning engagement with said belt and to pre-load the spring to bias the eccentric pivoted structure;

wherein a belt load force applied by said belt to said belt tensioner pulley is centered about a belt centerline plane bisecting a width of the belt;

said eccentric pivot shaft contacting said mounting bolt at a contact portion opposing the belt load force;

said contact portion being limited to a location on one side of said belt centerline plane remote from said motor vehicle engine; and said contact portion is spaced a sufficient distance from said belt centerline plane so that said contact portion tilts the eccentric pivot shaft beyond a perpendicular relation with the engine, towards the belt.

31. The belt tensioner according to claim 30, wherein said mounting bolt is eccentrically disposed relative to a cylindrical surface of said eccentric pivot shaft on which said eccentric pivoted structure is mounted for pivoted movement, wherein said contact portion comprises an area of contact between an inner surface portion of said eccentric pivot shaft and an outer surface portion of said mounting bolt, which area of contact is limited to said one side of the belt centerline plane.

* * * * *